US012244068B2

(12) United States Patent
Kim et al.

(10) Patent No.: US 12,244,068 B2
(45) Date of Patent: Mar. 4, 2025

(54) ANTENNA MODULE AND ELECTRONIC DEVICE INCLUDING THE SAME

(71) Applicant: SAMSUNG ELECTRONICS CO., LTD., Suwon-si (KR)

(72) Inventors: Youngsub Kim, Suwon-si (KR); Junsig Kum, Suwon-si (KR); Seungtae Ko, Suwon-si (KR); Byungchul Kim, Suwon-si (KR); Yoongeon Kim, Suwon-si (KR); Seungho Choi, Suwon-si (KR); Jungmin Park, Suwon-si (KR); Youngju Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 18/109,607

(22) Filed: Feb. 14, 2023

(65) Prior Publication Data

US 2023/0198167 A1 Jun. 22, 2023

Related U.S. Application Data

(63) Continuation of application No. PCT/KR2022/004796, filed on Apr. 4, 2022.

(30) Foreign Application Priority Data

Apr. 2, 2021 (KR) ........................ 10-2021-0043635

(51) Int. Cl.
*H01Q 21/24* (2006.01)
*H01Q 1/24* (2006.01)
*H01Q 9/04* (2006.01)

(52) U.S. Cl.
CPC ............. *H01Q 21/24* (2013.01); *H01Q 1/248* (2013.01); *H01Q 9/0442* (2013.01); *H01Q 9/045* (2013.01)

(58) Field of Classification Search
CPC .. H01Q 21/0025; H01Q 21/061; H01Q 21/08; H01Q 21/24; H01Q 1/246;
(Continued)

(56) References Cited

U.S. PATENT DOCUMENTS

| | | | |
|---|---|---|---|
| 5,686,928 | A | 11/1997 | Pritchett et al. |
| 5,986,614 | A | 11/1999 | Suesada et al. |

(Continued)

FOREIGN PATENT DOCUMENTS

| | | |
|---|---|---|
| CN | 202678523 | 1/2013 |
| CN | 106910993 | 6/2017 |

(Continued)

OTHER PUBLICATIONS

Extended European Search Report dated Jun. 5, 2024 issued in European Patent Application No. 22781719.4.

(Continued)

*Primary Examiner* — Jason M Crawford
(74) *Attorney, Agent, or Firm* — Nixon & Vanderhye, P.C.

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). According to embodiments of the disclosure, an antenna module in a wireless communication system may include: a plurality of antenna elements; a first antenna substrate; a second antenna substrate; and a Printed Circuit Board (PCB). A first side of the first antenna substrate may be coupled to each of the plurality of antenna elements, and a second side of the first antenna substrate opposite to the first side of the first antenna substrate may be coupled to the PCB. A first side of the second antenna substrate may be coupled to each of the plurality of antenna elements, and a second side of the (Continued)

second antenna substrate opposite to the first side of the second antenna substrate may be coupled to the PCB. A face between the first side of the first antenna substrate and the second side of the first antenna substrate may face a face between the first side of the second antenna substrate and the second side of the second antenna substrate.

20 Claims, 16 Drawing Sheets

(58) Field of Classification Search
CPC ........ H01Q 1/526; H01Q 9/042; H01Q 9/045; H01Q 5/40; H01Q 5/42
See application file for complete search history.

(56) References Cited

U.S. PATENT DOCUMENTS

| | | | | |
|---|---|---|---|---|
| 6,239,764 | B1 * | 5/2001 | Timofeev | H01Q 9/065 343/810 |
| 6,359,596 | B1 * | 3/2002 | Claiborne | H01Q 1/38 343/797 |
| 7,050,014 | B1 * | 5/2006 | Chen | H01Q 9/285 343/795 |
| 7,978,144 | B2 | 7/2011 | Tanabe et al. | |
| 9,335,358 | B2 * | 5/2016 | Derat | G01R 29/08 |
| 10,523,306 | B2 | 12/2019 | Ng et al. | |
| 11,088,731 | B2 | 8/2021 | Kim et al. | |
| 11,177,582 | B2 | 11/2021 | Seo | |
| 11,283,192 | B2 * | 3/2022 | Lea | H01Q 25/00 |
| 11,469,499 | B2 * | 10/2022 | Kim | H04B 1/18 |
| 2003/0076264 | A1 | 4/2003 | Yuanzhu | |
| 2003/0112200 | A1 | 6/2003 | Marino | |
| 2009/0146883 | A1 | 6/2009 | Chin et al. | |
| 2017/0012364 | A1 | 1/2017 | Yang et al. | |
| 2017/0244159 | A1 * | 8/2017 | Moon | H01Q 5/42 |
| 2018/0062271 | A1 * | 3/2018 | Toyao | H01Q 9/30 |
| 2019/0393619 | A1 | 12/2019 | Kim et al. | |
| 2023/0198167 | A1 * | 6/2023 | Kim | H01Q 1/246 343/893 |

FOREIGN PATENT DOCUMENTS

| | | |
|---|---|---|
| CN | 110323575 | 10/2019 |
| EP | 1 481 440 | 9/2006 |
| JP | 2001-244731 | 9/2001 |
| JP | 2007-116232 | 5/2007 |
| JP | 2007-135038 | 5/2007 |
| JP | 2011-035733 | 2/2011 |
| KR | 10-0630331 | 9/2006 |
| KR | 10-2018-0055772 | 5/2018 |
| KR | 10-2019-0074064 | 6/2019 |
| WO | 2009/021550 | 2/2009 |

OTHER PUBLICATIONS

International Search Report mailed Jul. 21, 2022 in PCT application PCT/KR2022/004796, 5 pages.
Written Opinion of the ISA mailed Jul. 21, 2022 in PCT application PCT/KR2022/004796, 3 pages.

* cited by examiner

ANTENNA MODULE AND ELECTRONIC DEVICE INCLUDING THE SAME

CROSS-REFERENCE TO RELATED APPLICATIONS

This application is a continuation of International Application No. PCT/KR2022/004796 designating the United States, filed on Apr. 4, 2022, in the Korean Intellectual Property Receiving Office and claiming priority to Korean Patent Application No. 10-2021-0043645, filed on Apr. 2, 2021, in the Korean Intellectual Property Office, the disclosures of which are incorporated by reference herein in their entireties.

BACKGROUND

Field

The disclosure relates, in general, to a wireless communication system, and, for example, to an antenna module for the wireless communication system and an electronic device including the antenna module.

Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Products equipped with multiple antennas are under development to improve communication performance, and it is expected that equipment with a much greater number of antennas will be used by utilizing a massive Multiple Input Multiple Output (MIMO) technology. With an increase in the number of antenna elements in a communication device, the number of Radio Frequency (RF) parts (e.g., a Printed Circuit Board (PCB), a feeding line, etc.) inevitably increases.

SUMMARY

Embodiments of the disclosure provide an antenna module for an efficient deployment structure and an electronic device including the antenna module.

Embodiments of the disclosure provide an antenna module for deploying antenna elements by avoiding a screw or bolt formed across a plurality of layers in a wireless communication system, and an electronic device including the antenna module.

Embodiments of the disclosure provide an antenna module for deploying antenna elements by avoiding a shield cap deployed across a plurality of layers in a wireless communication system, and an electronic device including the antenna module.

Embodiments of the disclosure provide an antenna module having an antenna Printed Circuit Board (PCB) deployed vertically in a wireless communication system, and an electronic device including the antenna module.

Embodiments of the disclosure provide an antenna module for designing a sub-array including a much greater number of antenna elements, and an electronic device including the antenna module.

According to example embodiments of the disclosure, an antenna module in a wireless communication system may include: a plurality of antenna elements; a first antenna substrate; a second antenna substrate; and a Printed Circuit Board (PCB). A first side of the first antenna substrate may be coupled to each of the plurality of antenna elements, and a second side of the first antenna substrate opposite to the first side of the first antenna substrate may be coupled to the PCB. A first side of the second antenna substrate may be coupled to each of the plurality of antenna elements, and a second side of the second antenna substrate opposite to the first side of the second antenna substrate may be coupled to the PCB. A face between the first side of the first antenna substrate and the second side of the first antenna substrate may face a face between the first side of the second antenna substrate and the second side of the second antenna substrate.

According to example embodiments of the disclosure, an electronic device in a wireless communication system may include: an antenna array including a plurality of sub-arrays; a plurality of first antenna substrates; a plurality of second antenna substrates; a PCB on which a plurality of radio frequency (RF) filters are disposed; a power supply; and a processor. A sub-array among the plurality of sub-arrays may include a plurality of antenna elements. The plurality of first antenna substrates may include a first antenna substrate corresponding to the sub-array. The plurality of second antenna substrates may include a second antenna substrate corresponding to the sub-array. A first side of the first antenna substrate may be coupled to each of the plurality of antenna elements, and a second side of the first antenna substrate opposite to the first side of the first antenna substrate may be coupled to the PCB. A first side of the second antenna substrate may be coupled to each of the plurality of antenna elements, and a second side of the second antenna substrate opposite to the first side of the second antenna substrate may be coupled to the PCB. A face between the first side of the first antenna substrate and the second side of the first antenna substrate may face a face between the first side of the second antenna substrate and the second side of the second antenna substrate.

An apparatus and method according to various example embodiments of the disclosure may use an antenna Printed Circuit Board (PCB) erected between a filter board and an antenna element in an Antenna and Filter Unit (AFU), thereby achieving a small-sized product.

In the AFU, a degree of freedom of a sub-array may be increased through the antenna PCB erected between the filter board and the antenna element.

Advantages achievable by the disclosure are not limited to the aforementioned advantages, and other advantages not mentioned herein may be clearly understood by those skilled in the art to which the disclosure pertains from the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
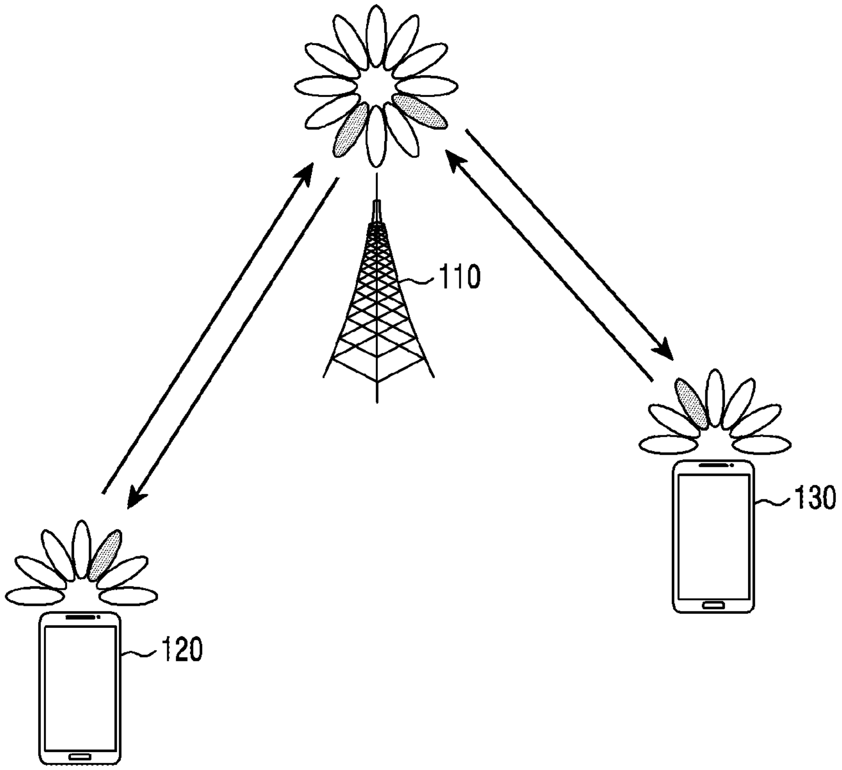
FIG. 1 is a diagram illustrating an example wireless communication system according to embodiments.

Terms used in the disclosure are for the purpose of describing various embodiments and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

The disclosure relates to an antenna module in a wireless communication system, and an electronic device including the antenna module. For example, the disclosure describes a technology in which an antenna Printed Circuit Board (PCB) is mounted in a standing manner in an Antenna and Filter Unit (AFU) to increase a degree of freedom in sub-array implementation and to increase efficiency in a PCB design in the wireless communication system.

Hereinafter, terms used to refer to parts of an electronic device (e.g., a substrate, a plate, a layer, a PCB, a Flexible PCB (FPCB), a module, an antenna, an antenna element, a circuit, a processor, a chip, a component, and a device), terms used to refer to a shape of the parts (e.g., a construction, a support portion, a contact portion, a protrusion, and an opening), terms used to refer to a connection unit between construction bodies (e.g., a connection portion, a contact portion, a support portion, a contact construction body, a conductive member, and an assembly), and terms used to refer to a circuitry (e.g., a transmission line, a PCB, an FPCB, a signal line, a feeding line, a data line, a Radio Frequency (RF) signal line, an antenna line, an RF path, an RF module, and an RF circuit), and the like are used for convenience of explanation. It will be understood that the disclosure is not limited to terms described below, and thus other terms having the same or similar technical meaning may also be used. In addition, the term '. . . unit', '. . . device', '. . . member', '. . . body', or the like may imply at least one configuration or may imply a unit of processing a function.

In addition, although the disclosure describes various embodiments using terms used in some communication standards (e.g., Long Term Evolution (LTE) and New Radio (NR) defined in $3^{rd}$ Generation Partnership Project (3GPP)), this is for purposes of example only. Various embodiments of the disclosure may be easily modified and applied to other communication systems.

In addition, although an expression 'greater than' or 'less than' may be used in the disclosure to determine whether a specific condition is fulfilled, this is for purposes of example only and does not exclude an expression of 'greater than or equal to' or 'less than or equal to'. A condition described as 'greater than or equal to' may be replaced with 'greater than'. A condition described as 'less than or equal to' may be replaced with 'less than'. A condition described as 'greater than or equal to and less than' may be replaced with 'greater than and less than or equal to'. The disclosure relates to an antenna module in a wireless communication system, and an electronic device including the antenna module. For example, the disclosure describes a technology in which an antenna PCB providing feeding to antenna elements is mounted in a standing manner to reduce a design constraint caused by a shield cap or a screw and to increase a degree of freedom in PCB and sub-array implementation.

FIG. 1 is a diagram illustrating an example wireless communication system according to various embodiments. As part of nodes which use a radio channel, a base station 110 and a terminal 120 are illustrated by way of non-limiting example in a wireless communication system 100 of FIG. 1.

Referring to FIG. 1, the base station 110 is a network infrastructure which provides a radio access to the terminal 120. The base station 110 has a coverage defined as a specific geographic region, based on a distance capable of transmitting a signal. In addition to the term 'base station', the base station 110 may be referred to as a Massive Multiple Input Multiple Output (MIMO) Unit (MMU), an 'Access Point (AP)', an 'eNodeB (eNB)', a '5th Generation (5G) node', a '5G nodeB (NB)', a 'wireless point', a 'Transmission/Reception Point (TRP)', an 'access unit', a 'Distributed Unit (DU)', a 'Transmission/Reception Point (TRP)', a 'Radio Unit (RU)', a Remote Radio Head (RRH), or other terms having equivalent technical meanings. The base station 110 may transmit a downlink signal or receive an uplink signal.

As a device used by a user, the terminal 120 communicates with the base station 110 through the radio channel. The terminal 120 may operate without user involvement. For example, as a device for performing Machine Type Communication (MTC), the terminal 120 may not be carried by the user. In addition to the term 'terminal', the terminal 120 may be referred to as a 'User Equipment (UE)', a 'mobile station', a 'subscriber station', a 'Customer Premises Equipment (CPE)', a 'remote terminal', a 'wireless terminal', an 'electronic device', a 'vehicle terminal', a 'user device', or other terms having equivalent technical meanings.

The terminal 120 and terminal 130 of FIG. 1 may support vehicle communication. In case of the vehicle communication, in an LTE system, based on a Device-to-Device (D2D) communication structure, a standardization task for a V2X technology was complete in the 3GPP releases 14 and 15, and at present, there is an ongoing effort for developing the V2X technology based on 5G NR. In NR V2X, unicast communication between terminals, groupcast (or multicast) communication, and broadcast communication are supported.

A beamforming technology may be used as one of technologies for mitigating a propagation path loss and increasing a propagation transfer distance. In general, the beamforming uses a plurality of antennas to concentrate a propagation arrival region or increase directivity of reception intensity. Therefore, instead of using a single antenna to produce a signal in an isotropic pattern, a communication equipment may be equipped with a plurality of antennas to form beamforming coverage. Hereinafter, an antenna array including the plurality of antennas will be described.

The base station 110 and/or the terminal 120 may include an antenna array. Each antenna included in the antenna array may be referred to as an array element or an antenna element. Hereinafter, although the antenna array is illustrated as a 2-dimensional planar array in the disclosure, this is for purposes of example only, and various embodiments of the disclosure are not limited thereto. The antenna array may be configured in various shapes such as a linear array, a multi-layer array, or the like. The antenna array may be referred to as a massive antenna array. According to an embodiment, the base station 110 or the terminal 120 may include a sub-array. In order to increase a signal gain, the electronic device according to embodiments of the disclosure may use a sub-array technology.

A technology for improving data capacity of 5G communication is a beamforming technology using an antenna array coupled to a plurality of RF paths. For higher data capacity, the number of RF paths shall be increased or power for each RF path shall be increased. The increasing of the RF path results in a larger size of products and may no longer be possible at present due to a spatial constraint in the installing of a base station equipment in practice. In order to increase an antenna gain through a high output without having to increase the number of RF paths, a plurality of antenna elements may be coupled using a splitter (or divider), thereby increasing the antenna gain. To increase communication performance, there is an increase in the number of parts performing wireless communication. In particular, there is also an increase in the number of antennas, RF parts (e.g., an amplifier, a filter) for processing an RF signal received or transmitted through the antenna, and components. Therefore, a spatial gain and cost efficiency are necessarily required while satisfying communication performance when a communication equipment is configured.

A sub-array technology may be used to increase a signal gain. A sub-array may be configured to provide a signal fed through an RFIC and filter to a greater number of antenna elements. The greater the number of antenna elements included in the sub-array, the greater the area required by an antenna PCB. The antenna module may include antenna elements and a filter. In various embodiments, the antenna module may further include an additional calibration network circuit. When a metal cavity filter is used, the antenna module requires a construction (e.g., a screw or a bolt) for tuning performance of the filter. Since such a construction causes a restriction in an area of the antenna PCB, it is unreasonable to unconditionally increase the number of antenna elements included the sub-array. In addition, the increase in the number of antenna elements results in an increase in the number of feeding lines for feeding respective antenna elements, which leads to a problem in that a PCB layer increases in thickness.

In order to minimize and/or reduce a spatial constraint of the antenna PCB, the disclosure proposes a method of configuring an antenna module in such a manner that an antenna PCB is mounted in a standing manner. Although a construction to which an antenna, an antenna PCB, and an RF filter are coupled is referred to as an antenna module in the disclosure, other terms having an equivalent technical meaning may also be used. In addition to the antenna module, terms such as an Antenna and Filter Unit (AFU), an antenna assembly, an antenna part, or the like may be used interchangeably. In addition, whether a metal plate is present in the antenna module, a position of the metal plate, whether a calibration network PCB is present, and a type of an RF filter may be used variously without departing from a scope which may change acceptably when embodiments of the disclosure are implemented by those ordinarily skilled in the art.

Figure 2A:
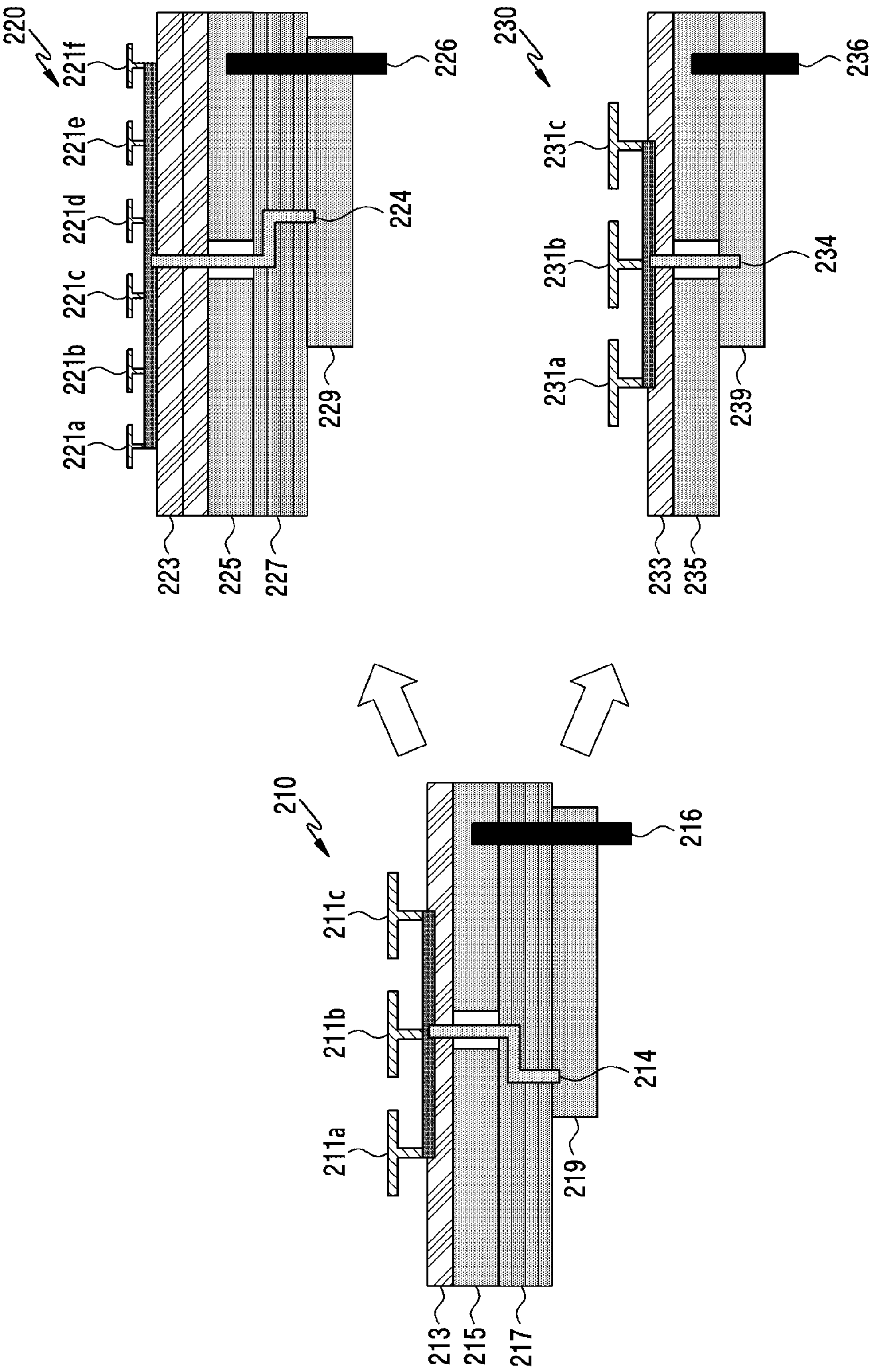
FIG. 2A is an example cross-sectional view of an antenna module according to embodiments.
Figure 2B:
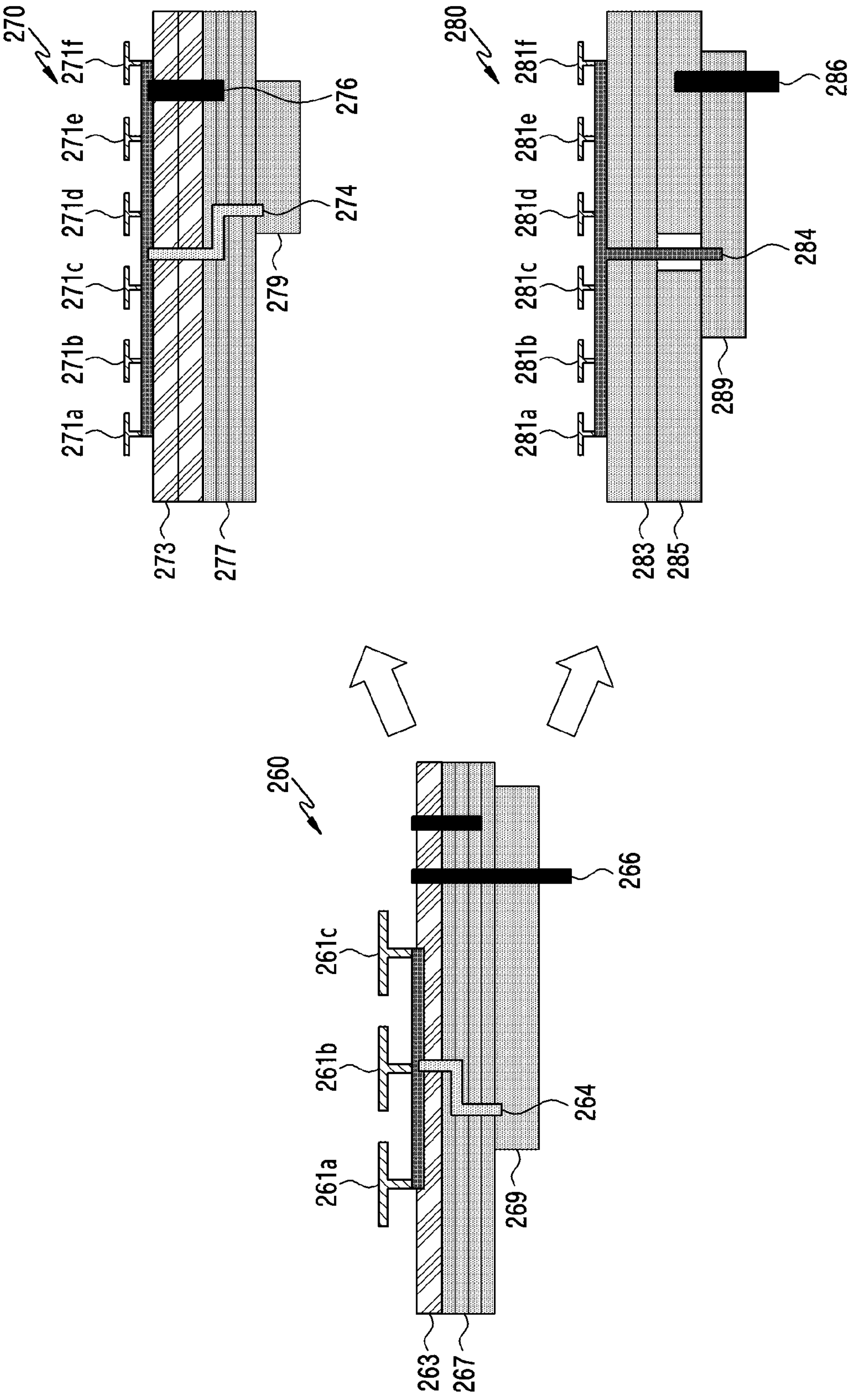
FIG. 2B is an example cross-sectional view of an antenna module according to embodiments.

FIG. 2A and FIG. 2B are cross-sectional views of an example antenna module according to embodiments. The antenna module may be a detachable antenna module or an integrated antenna module. The detachable antenna module and the integrated antenna module may be identified according to a deployment of an antenna PCB and a calibration network PCB. The detachable antenna module may have a structure in which a metal substrate layer is deployed between the antenna PCB and the calibration network PCB. The integrated antenna module may have a structure in which the antenna PCB and the calibration network PCB are coupled directly. That is, in the integrated antenna module, at least one layer for antenna feeding and at least one layer for a calibration network circuit in the PCB without the metal substrate layer may be located continuously. Although it may appear to be illustrated as that one layer corresponds to the PCB and the substrate layer in FIG. 2A and FIG. 2B, it is to be understood that embodiments of the disclosure are not limited by the drawings. For example, the PCB may be constructed of a plurality of substrate layers. In addition, for example, a metal plate may also be constructed of two or more layers.

Referring to FIG. 2A, a cross-sectional view of an example detachable antenna module are illustrated. An antenna module 210 may include antennas 211*a*, 211*b*, and 211*c*, an antenna PCB 213, a metal plate 215, a calibration network PCB 217, and a filter 219. The antenna module 210 may have a structure in which the antennas 211*a*, 211*b*, and 211*c*, the antenna PCB 213, the metal plate 215, the calibration network PCB 217, and the filter 219 are stacked in that order. A feeding line 214 for transferring an RF signal output from the filter to the antenna may be mounted across the antenna PCB 213, the metal plate 215, and the calibration network PCB 217. RF parts have tolerances whenever assembled. To cancel the tolerance, a capacitance value is adjusted by adjusting an interval between a resonator and a tuning bolt 216, thereby tuning the resonator of the filter. The tuning bolt 216 may be deployed across the metal plate 215, the calibration network PCB 217, and the filter 219.

An antenna module 220 may include antennas 221*a*, 221*b*, 221*c*, 221*d*, 221*e*, and 221*f*, an antenna PCB 223, a metal plate 225, a calibration network PCB 227, and a filter 229. The antenna module 220 may have a structure in which the antennas 221*a*, 221*b*, 221*c*, 221*d*, 221*e*, and 221*f*, the antenna PCB 223, the metal plate 225, the calibration network PCB 227, and the filter 229 are stacked in that order. A feeding line 224 for transferring an RF signal output from the filter to the antenna may be mounted across the antenna PCB 223, the metal plate 225, and the calibration network PCB 227. RF parts have tolerances whenever assembled. To cancel the tolerance, a capacitance value is adjusted by adjusting an interval between a resonator and a tuning bolt 226, thereby tuning the resonator of the filter. The tuning bolt 226 may be deployed across the metal plate 225, the calibration network PCB 227, and the filter 229. The antenna module 220 may include more antenna elements than the antenna module 210. For example, the antenna module 220 may include antenna elements in a shape of a 6×1 sub-array. In order to accommodate more antenna elements, the number of layers of the antenna PCB 223 may be greater than the number of layers of the antenna PCB 213. In order to mount additional antenna elements, the antenna PCB in the antenna module 220 accommodates more antenna elements instead of adding an antenna module, thereby reducing cost of a communication equipment.

An antenna module 230 may include antennas 231*a*, 231*b*, and 231*c*, an antenna PCB 233, a metal plate 235, and a filter 239. According to an embodiment, the antenna module 230 may have a structure in which a calibration network circuit is removed from the antenna module 210. The antenna module 230 may have a structure in which the antennas 231*a*, 231*b*, and 231*c*, the antenna PCB 233, the metal plate 235, and the filter 239 are stacked in that order. A feeding line 234 for transferring an RF signal output from the filter to the antenna may be mounted across the antenna PCB 233 and the metal plate 235. RF parts have tolerances whenever assembled. To cancel the tolerance, a capacitance value is adjusted by adjusting an interval between a resonator and a tuning bolt 236, thereby tuning the resonator of the filter. The tuning bolt 236 may be deployed across the metal plate 235 and the filter 239.

Referring to FIG. 2B, cross-sectional views of an example integrated antenna module are illustrated. An antenna module 260 may include antennas 261*a*, 261*b*, and 261*c*, an antenna PCB 263, a calibration network PCB 267, and a filter 269. The antenna module 260 may have a structure in which the antennas 261*a*, 261*b*, and 261*c*, the antenna PCB 263, the calibration network PCB 267, and the filter 269 are stacked in that order. A feeding line 264 for transferring an RF signal output from the filter to the antenna may be mounted across the antenna PCB 263 and the calibration network PCB 267. RF parts have tolerances whenever assembled. To cancel the tolerance, a capacitance value is adjusted by adjusting an interval between a resonator and a tuning bolt 266, thereby tuning the resonator of the filter. The tuning bolt 266 may be deployed across the calibration network PCB 267, and the filter 269.

An antenna module 270 may include antennas 271*a*, 271*b*, 271*c*, 271*d*, 271*e*, and 271*f*, an antenna PCB 273, a calibration network PCB 277, and a filter 279. The antenna module 270 may have a structure in which the antennas 271*a*, 271*b*, 271*c*, 271*d*, 271*e*, and 271*f*, the antenna PCB 273, the calibration network PCB 277, and the filter 279 are stacked in that order. According to an embodiment, the filter 279 may be a ceramic filter. A feeding line 274 for transferring an RF signal output from the filter to the antenna may be mounted across the antenna PCB 273 and the calibration network PCB 277. In order to remove or reduce electromagnetic noise caused by the calibration network PCB 277, the antenna module 270 may include a shield cap 276. The shield cap 276 may be deployed across the calibration network PCB 277 and the antenna PCB 273.

The antenna module 270 may include more antenna elements than the antenna module 210. For example, the antenna module 270 may include antenna elements in a shape of a 6×1 sub-array. In order to accommodate more antenna elements, the number of layers of the antenna PCB 273 may be greater than the number of layers of the antenna PCB 213. In order to mount additional antenna elements, the antenna PCB in the antenna module 270 accommodates more antenna elements instead of adding an antenna module, thereby reducing cost of a communication equipment. The ceramic filter (e.g., the filter 279) is lighter in weight than a metal cavity filter (e.g., the filter 219, the filter 229, and a filter 289). The antenna module 270 including the ceramic filter may not include a bolt (or a screw) for tuning the metal cavity filter, or may include relatively fewer tuning bolts. In addition, since there is no metal plate which facilitates mechanical rigidity, the antenna module including the ceramic filter may be designed with an integrated structure. Even if there is no tuning bolt, the antenna module may require a shield cap. Even if the shield cap is exposed on the antenna PCB, a feeding design for each antenna element was possible in a 2×1 sub-array or a 3×1 sub-array by avoiding the exposed region. However, since an increase in the number of antenna elements results in more complicated feeding lines and also results in an increase in a required region, there is a problem in that a structure of accommodating all of the antenna elements is not easy in a limited space.

An antenna module 280 may include antennas 281*a*, 281*b*, 281*c*, 281*d*, 281*e*, and 281*f*, an antenna PCB 283, a metal plate 285, and a filter 289. According to an embodiment, the antenna module 280 may have a structure in which the metal plate 285 is deployed, instead of the calibration network circuit 277 in the antenna module 270. The antenna module 280 may have a structure in which the antennas 281*a*, 281*b*, 281*c*, 281*d*, 281*e*, and 281*f*, the antenna PCB 283, the metal plate 285, and the filter 289 are stacked in that order. A feeding line 284 for transferring an RF signal output from the filter to the antenna may be mounted across the antenna PCB 283 and the metal plate 285. RF parts have tolerances whenever assembled. To cancel the tolerance, a capacitance value is adjusted by adjusting an interval between a resonator and a tuning bolt 286, thereby tuning the resonator of the filter. To cancel the tolerance, a capacitance value is adjusted by adjusting an interval between a resonator and a tuning bolt 286, thereby tuning the resonator of the filter. The tuning bolt 286 may be deployed across the metal plate 285, and the filter 289. Although not shown in FIG. 2B, since the tuning bolt 286 is deployed closer to the antenna PCB 283, there may be a design constraint.

Since a metal plate of a detachable antenna module covers a screw deployed across substrate layers from the filter, there is no part exposed from the antenna PCB. Since a spatial constraint is not significant, it is possible to deploy a relatively great number of antenna elements on the antenna PCB. However, there is a problem in that the metal plate causes an increase in weight and an increase in product cost of the antenna module. Since an integrated antenna module does not have a metal plate, such a problem may be addressed. Meanwhile, there is a disadvantage in that an effective antenna design is difficult in the integrated antenna module since both a shield cap and a screw may be exposed to up to the antenna PCB. In order to address the aforementioned problem, embodiments of the disclosure propose an antenna module in which an antenna PCB is mounted in a standing manner on a metal plate or a calibration network PCB. An antenna module having a structure proposed in the disclosure may be applied to the integrated antenna module and the detachable antenna module. Since the antenna PCB is mounted vertically, a greater number of antenna elements may be accommodated by one antenna module (antenna PCB). In addition, spatial cost may be reduced by decreasing the number of substrate layers stacked in the antenna module.

Figure 3A:
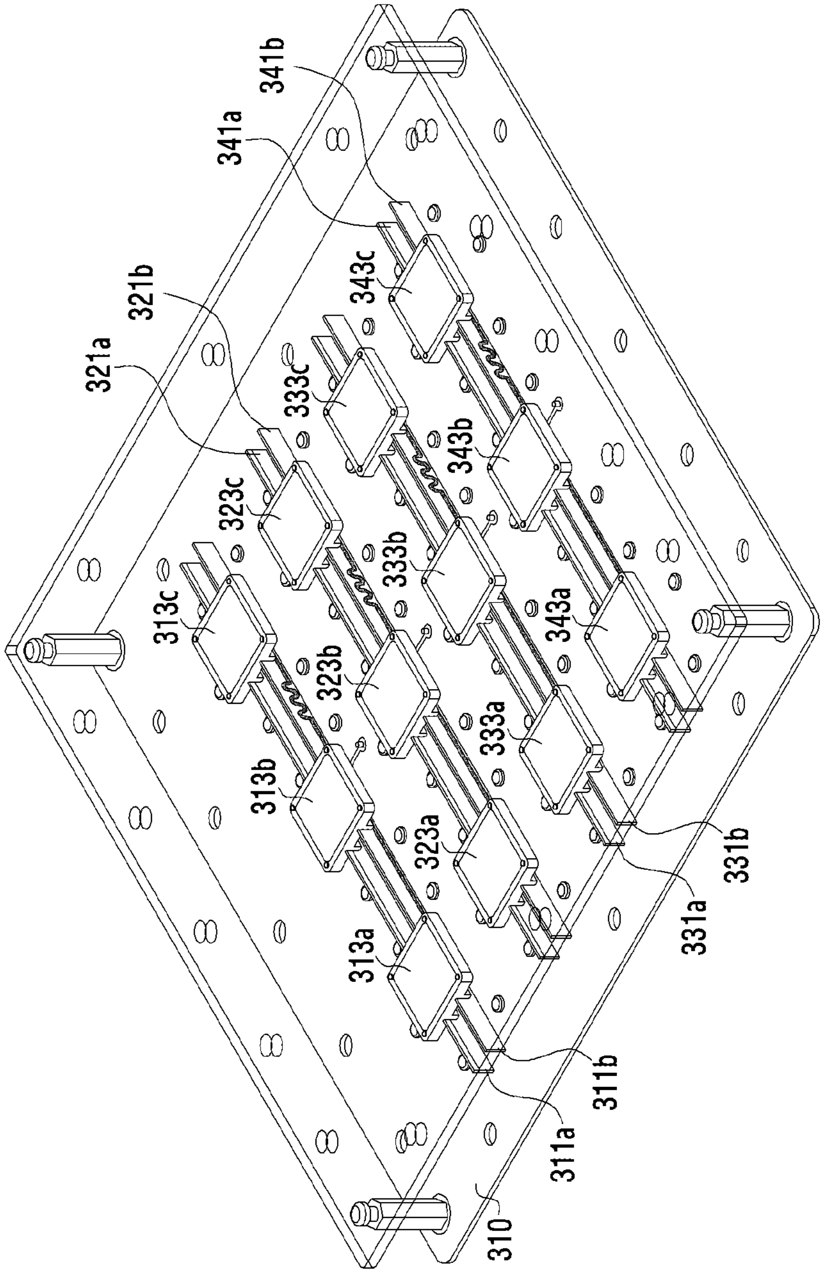
FIG. 3A is a perspective view illustrating an example antenna module based on a standing deployment of an antenna board according embodiments.
Figure 3B:
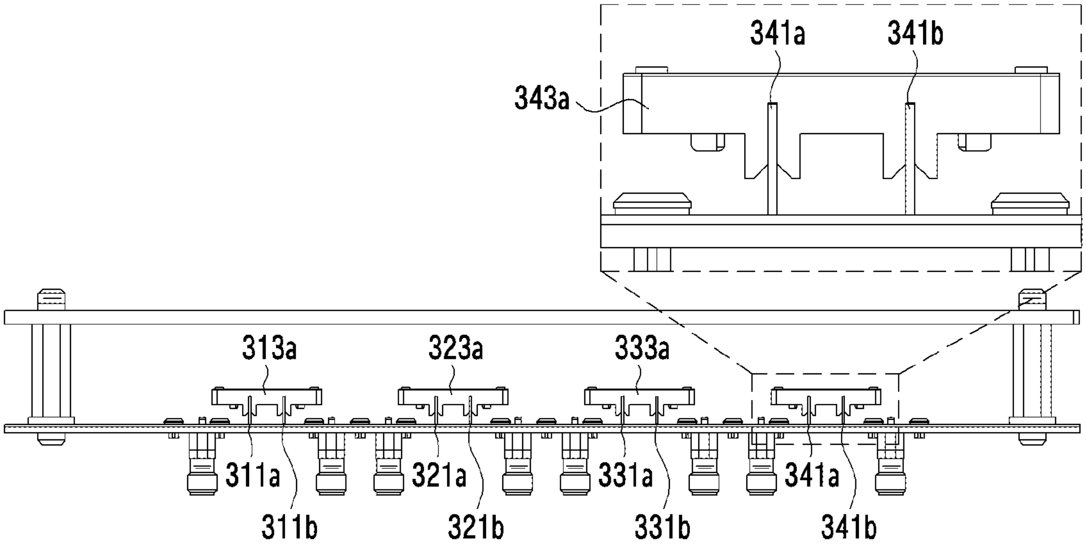
FIG. 3B is a diagram illustrating an example antenna module based on a standing deployment of an antenna board according to embodiments.

FIG. 3A is a perspective view illustrating an example antenna module based on a standing deployment of an antenna board according embodiments. FIG. 3B is a diagram illustrating an example antenna module based on a standing deployment of an antenna board according to embodiments. The standing deployment may refer, for example, to a structure in which an antenna PCB is deployed in a standing manner on a metal plate or a calibration PCB. The antenna module based on the standing deployment of the antenna board may be referred to as a standing antenna module. A face on which the antenna PCB is erected may be a face of the metal place or calibration PCB. A face on which the antenna PCB is coupled may vary depending on whether it is a detachable antenna module or an integrated antenna module. Hereinafter, for convenience of description, a plate on which the antenna PCB is erected is referred to as a board or a PCB. An antenna module including the standing antenna board may be referred to as a standing antenna module.

Referring to FIG. 3A, the antenna module may include a plurality of antenna elements. FIG. 3A is a perspective view of the antenna module. The antenna module of FIG. 3A is simply an example for explaining various example embodiments of the disclosure, and it is understood that embodiments of the disclosure are not limited by specific parts and constructions illustrated in the drawing. The antenna module may include an antenna array including a plurality of sub-arrays. For example, the antenna module may include 4 3×1 sub-arrays. The antenna module may include a first sub-array, a second sub-array, a third sub-array, and a fourth sub-array. The first sub-array may include an antenna element 313*a*, an antenna element 313*b*, and an antenna element 313*c*. The second sub-array may include an antenna element 323*a*, an antenna element 323*b*, and an antenna element 323*c*. The third sub-array may include an antenna element 333*a*, an antenna element 333*b*, and an antenna element 333*c*. The fourth sub-array may include an antenna element 343*a*, an antenna element 343*b*, and an antenna element 343*c*.

According to an embodiment, in order to increase a signal gain, a dual-polarization antenna may be used. The antenna element may be a radiator for feeding of a dual polarization. Two signals may be fed in the antenna elements. The more the signals of different polarizations fulfill independence on a channel, the higher the polarization diversity and a signal gain based thereon may be. According to an embodiment, a first polarization and a second polarization may be orthogonal to each other. For example, the first polarization is a −45° polarization, and the second polarization is a +45° polarization. An antenna substrate may be deployed in a standing manner in each sub-array. In order to feed the two signals having the different polarizations to each antenna element, two antenna substrates may be coupled in a standing manner in each sub-array.

Referring to FIG. 3B, a front view of an antenna module is illustrated. The antenna module may have a structure in which a filter, a board 310, an antenna PCB, an antenna element, and a cover are stacked in that order. A cover for covering the antenna module and a construction for supporting the cover may be additionally deployed. According to an embodiment, an antenna substrate may be mounted in a standing manner in each sub-array. A first antenna substrate 311*a* for a first polarization may be deployed to be coupled to a first sub-array and the board 310. A second antenna substrate 311*b* for a second polarization may be deployed to be coupled to the first sub-array and the board 310. In this case, a face of the first antenna substrate 311*a* may be deployed to face a face of the second antenna substrate 311*b*. Hereinafter, a face on which the antenna substrate faces another antenna substrate or an opposite face of the facing face may be referred to as a standing face. The standing face of each antenna substrate may be located between the first sub-array and the board 310. The first antenna substrate 311*a* may be deployed not in such a manner that the standing face of the first antenna substrate 311*a* is deployed to be parallel to the board 310 but in such a manner that the standing face of the first antenna substrate 311*a* is erected from the board 310. The first antenna substrate 311*a* may be deployed in such a manner that the standing face of the first antenna substrate 311*a* is substantially vertical to the board 310. The second antenna substrate 311*b* may be deployed not in such a manner that the standing face of the second antenna substrate 311*b* is deployed on the board 310 but in such a manner that the standing face of the second antenna substrate 311*b* is erected from the board 310. The second antenna substrate 311*b* may be deployed such that the standing face of the second antenna substrate 311*b* is substantially vertical to the board 310.

A signal provided from a filter may be transferred to each antenna element of the sub-array, through the board 310. For a feeding path, an antenna PCB may be mounted in a standing manner. The antenna module may include a standing antenna board for each sub-array. Accordingly, descriptions on the first sub-array may also equally apply to the second sub-array, the third sub-array, and the fourth sub-array.

According to an embodiment, a third antenna substrate 321*a* for the first polarization may be deployed to be coupled to the second sub-array and the board 310. A fourth antenna substrate 321*b* for the second polarization may be deployed to be coupled to the second sub-array and the board 310. In this case, a face of the third antenna substrate 321*a* may be deployed to face a face of the fourth antenna substrate 321*b*. A standing face of each antenna substrate may be located between the second sub-array and the board 310. The third antenna substrate 321*a* may be deployed not in such a manner that the standing face of the third antenna substrate 321*a* is deployed on the board 310 but in such a manner that the standing face of the third antenna substrate 321*a* is erected from the board 310. The third antenna substrate 321*a* may be deployed in such a manner that the standing face of the third antenna substrate 321*a* is substantially vertical to the board 310. The fourth antenna substrate 321*b* may be deployed not in such a manner that the standing face of the fourth antenna substrate 321*b* is deployed on the board 310 but in such a manner that the standing face of the fourth antenna substrate 321*b* is erected from the board 310. The fourth antenna substrate 321*b* may be deployed such that the standing face of the fourth antenna substrate 321*b* is substantially vertical to the board 310.

According to an embodiment, a fifth antenna substrate 331*a* for the first polarization may be deployed to be coupled to the third sub-array and the board 310. A sixth antenna substrate 331*b* for the second polarization may be deployed to be coupled to the third sub-array and the board 310. In this case, a face of the fifth antenna substrate 331*a* may be deployed to face a face of the sixth antenna substrate 331*b*. A standing face of each antenna substrate may be located between the third sub-array and the board 310. The third antenna substrate 321 may be deployed not in such a manner that the standing face of the fifth antenna substrate 331*a* is deployed on the board 310 but in such a manner that the standing face of the fifth antenna substrate 331*a* is erected from the board 310. The fifth antenna substrate 331*a* may be deployed in such a manner that the standing face of the fifth antenna substrate 331*a* is substantially vertical to the board 310. The sixth antenna substrate 331*b* may be deployed not in such a manner that the standing face of the sixth antenna substrate 331*b* is deployed on the board 310 but in such a manner that the standing face of the sixth antenna substrate 331*b* is erected from the board 310. The sixth antenna substrate 331*b* may be deployed such that the standing face of the sixth antenna substrate 331*b* is substantially vertical to the board 310.

According to an embodiment, a seventh antenna substrate 341*a* for the first polarization may be deployed to be coupled to the fourth sub-array and the board 310. An eighth antenna substrate 341*b* for the second polarization may be deployed to be coupled to the fourth sub-array and the board 310. In this case, a face of the seventh antenna substrate 341*a* may be deployed to face a face of the eighth antenna substrate 341*b*. A standing face of each antenna substrate may be located between the fourth sub-array and the board 310. The third antenna substrate 321 may be deployed not in such a manner that the standing face of the seventh antenna substrate 341*a* is deployed on the board 310 but in such a manner that the standing face of the seventh antenna substrate 341*a* is erected from the board 310. The seventh antenna substrate 341*a* may be deployed in such a manner that the standing face of the seventh antenna substrate 341*a* is substantially vertical to the board 310. The eighth antenna substrate 341*b* may be deployed not in such a manner that the standing face of the eighth antenna substrate 341*b* is deployed on the board 310 but in such a manner that the standing face of the eighth antenna substrate 341*b* is erected from the board 310. The eighth antenna substrate 341*b* may be deployed such that the standing face of the eighth antenna substrate 341*b* is substantially vertical to the board 310.

The antenna substrate may be coupled to an antenna element. The antenna element may include a patch radiator. A side face of a standing face of the antenna substrate may be coupled to a face of a patch. According to an embodiment, as illustrated in FIG. 3B, a construction (e.g., a groove shape) for accommodating the side face of the antenna substrate may be formed in the antenna element. Each antenna element may have a structure for coupling two antenna substrates, e.g., the second antenna substrate for the first polarization and the second antenna substrate for the second polarization. The structure illustrated in FIG. 3B is a non-limiting example of the disclosure. According to an embodiment, the antenna element of the antenna module may be a patch antenna without a separate groove structure or fastening structure.

Figure 4:
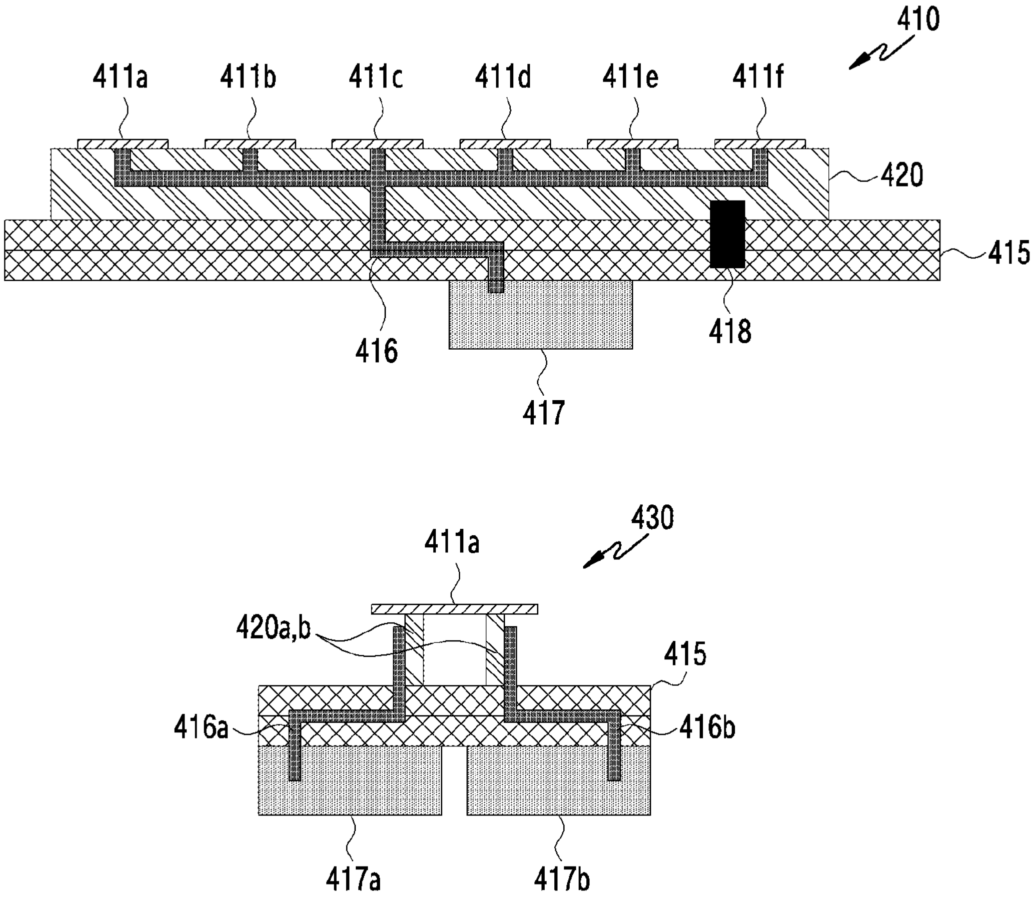
FIG. 4 is a cross-sectional view of an example antenna module based on a standing deployment of an antenna board according to embodiments.

FIG. 4 is a cross-sectional view of an example antenna module based on a standing deployment of an antenna board according to embodiments. The standing deployment may refer, for example, to the antenna board being deployed in a standing manner, instead of being stacking on another board. The antenna board may include one or more substrate layers similarly to a general PCB. The antenna module based on the standing deployment of the antenna board may be referred to as a standing antenna module.

Referring to FIG. 4, a side view 410 of an antenna module and a front view 430 of the antenna module are illustrated. Referring to the side view 410, the antenna module may include a sub-array. For example, the antenna module may include a 6×1 sub-array. The antenna module may include a plurality of antenna elements. The antenna module may include a first antenna element 411*a*, a second antenna element 411*c*, a third antenna element 411*b*, a fourth antenna element 411*d*, a fifth antenna element 411*e*, and a sixth antenna element 411*f*. An RF signal output from a filter may be transferred to each antenna element. A feeding circuit for feeding the RF signal to each antenna element may be deployed across a PCB 415 and a standing antenna board 420.

According to an embodiment, the PCB 415 may include a calibration network PCB. In order to shield an electromagnetic signal generated in the calibration network, a shield cap 418 may be deployed across the PCB 415 and the standing antenna board 420. In this case, the standing antenna board 420 may be mounted substantially vertically. The standing antenna board 420 may be mounted on a face of the PCB 415, in addition to a region in which the shield cap 418 is formed. Compared to a case where the antenna PCB is stacked on a face of the PCB 415, a mounting region of the antenna PCB is reduced when the antenna PCB is deployed in a standing manner, which results in a larger free space. Since a substrate layer and another substrate layer are deployed vertically, rather than a structure in which a substrate layer and another substrate layer are stacked, a region in which the shield cap 418 is formed has relatively less effect on a space of antenna elements.

Referring to the front view 430, a first antenna substrate 420*a* and a second antenna substrate 420*b* are deployed in a standing manner with respect to a coupling face of the antenna element 411*a*. The standing manner may refer, for example, a mounting face of the antenna substrate being deployed not to be parallel to a mounting face of another substrate (or PCB) but to be substantially vertical. The first antenna substrate 420*a* may be an antenna substrate for a first polarization. The first antenna substrate 420*a* may have a feeding line 416*a* mounted for transferring a signal of the first polarization. A face on which the first feeding line 416*a* for the first antenna substrate 420*a* is mounted may be a standing face. The standing face may be located vertically between a surface of the board 415 and the coupling face of the antenna element 411*a*. A first filter 417*a* may output a signal of the first polarization. The first filter 417*a* may transfer the signal of the first polarization to the antenna element 411*a* through the first feeding line 416*a*. The second antenna substrate 420*b* may be an antenna substrate for a second polarization. The second antenna substrate 420*b* may have the feeding line 416*b* mounted for transferring a signal of the second polarization. A face on which the second feeding line 416*b* for the second antenna substrate 420*b* is mounted may be a standing face. The standing face may be located vertically between a surface of the board 415 and the coupling face of the antenna element 411*a*. The second filter 417*b* may output a signal of the second polarization. The second filter 417*b* may transfer the signal of the second polarization to the antenna element 411*a* through the second feeding line 416*b*.

FIGS. 5A, 5B, 5C and 5D (which may be referred to as FIG. 5A to FIG. 5D) are cross-sectional views of an example antenna module based on a standing deployment of an antenna board according to embodiments. An antenna substrate (antenna board) may be deployed in a standing manner against a face of a PCB. For example, at least one antenna substrate may be mounted vertically between each antenna element and the PCB. Hereinafter, examples of a standing antenna module according to embodiments of the disclosure are described with reference to FIG. 5A to FIG. 5D. However, it is understood that embodiments of the disclosure are not limited to the examples described with reference to FIG. 5A to FIG. 5D. If the antenna module includes a structure in which the antenna substrate is mounted in a standing manner (e.g., mounted vertically), it may be understood as an embodiment of the disclosure.

Figure 5A:
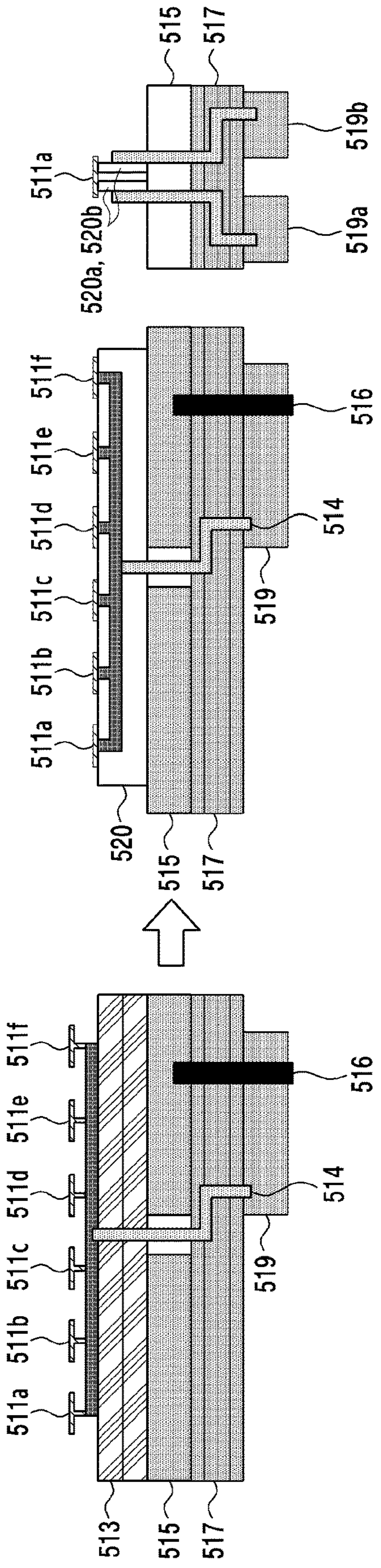
FIG. 5A is a cross-sectional view of an example antenna module based on a standing deployment of an antenna board according to embodiments.

Referring to FIG. 5A, an antenna module 510 may include antennas 511*a*, 511*b*, 511*c*, 511*d*, 511*e*, and 511*f*, an antenna PCB 513, a metal plate 515, a calibration network PCB 517, and a filter 519. The antenna module 510 may have a structure in which the antennas 511*a*, 511*b*, 511*c*, 511*d*, 511*e*, and 511*f*, the antenna PCB 513, the metal plate 515, the calibration network PCB 517, and the filter 519 are stacked in that order. A feeding line 514 for transferring an RF signal output from the filter to the antenna may be mounted across the antenna PCB 513, the metal plate 515, and the calibration network PCB 557. RF parts have tolerances whenever assembled. To cancel the tolerance, a capacitance value is adjusted by adjusting an interval between a resonator and a tuning bolt 516, thereby tuning the resonator of the filter. The tuning bolt 516 may be deployed across the metal plate 515, the calibration network PCB 517, and the filter 519.

In this case, when a length of the tuning bolt 516 is increased or a stacked structure of the antenna PCB 513 becomes thick to cover a greater number of antennas, there may be a design constraint. In order to address this problem, a standing antenna board according to embodiments of the disclosure is proposed. An antenna PCB 520 may be deployed in a standing manner with respect to the metal plate 515. For example, the antenna PCB 520 may be deployed in a vertically mounted manner with respect to a surface.

Although the single antenna PCB 520 is illustrated in the side view, embodiments of the disclosure are not limited thereto. The antenna module may include two antenna substrates. For example, when the antenna module is viewed from the front, a first antenna substrate 520*a* and a second antenna substrate 520*b* may be deployed in a standing manner between the metal plate 515 and the antenna element 511*a*. The standing manner may refer, for example, to a structure in which a mounting face (or a standing face) of the first antenna substrate 520*a* is deployed to connect the metal plate 515 and the antenna 511*a*. The standing manner may refer, for example, to a structure in which a mounting face (or a standing face) of the second antenna substrate 520*b* is deployed to connect the metal plate 515 and the antenna element 511*a*. Although only the single antenna 511*a* is illustrated in the front view, embodiments of the disclosure are not limited thereto. According to an embodiment, two antenna substrates may be coupled to respective antenna elements through a deployment in which the two antenna substrates face (substantially in parallel). The first antenna substrate 520*a* may include one or more feeding lines for transferring a signal of a first polarization. The second antenna substrate 520*b* may include one or more feeding lines for transferring a signal of a second polarization. A first RF filter 519*a* for processing the signal of the first polarization may be deployed on a face of the calibration network PCB 517. A second RF filter 519*b* for processing the signal of the second polarization may be deployed on a face of the calibration network PCB 517.

Figure 5B:
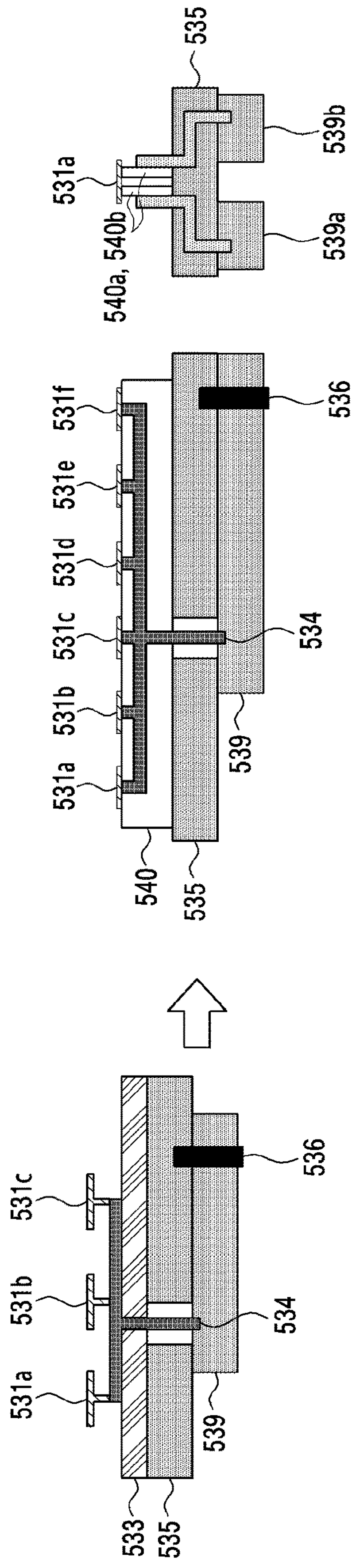
FIG. 5B is a cross-sectional view of an example antenna module based on a standing deployment of an antenna board according to embodiments.

Referring to FIG. 5B, an antenna module 530 may include antennas 531*a*, 531*b*, and 531*c*, an antenna PCB 533, a metal plate 535, and a filter 539. The antenna module 530 may have a structure in which the antennas 531*a*, 531*b*, and 531*c*, the antenna PCB 533, the metal plate 535, and the filter 539 are stacked in that order. A feeding line 534 for transferring an RF signal output from the filter to the antenna may be mounted across the antenna PCB 533, the metal plate 535. A tuning bolt 536 may be deployed across the metal plate 535 and the filter 539. Similarly to FIG. 5A, when a length of the tuning bolt 536 is increased or a stacked structure of the antenna PCB 533 becomes thick to cover a great number of antennas, there may be a design constraint. In order to address this problem, a standing antenna board according to embodiments of the disclosure is proposed. An antenna PCB 540 may be deployed in a standing manner with respect to the metal plate 515. That is, the antenna PCB 540 may be deployed in a vertically mounted manner with respect to a surface.

To increase efficiency of the sub-array technology, the antenna module may be configured to accommodate a greater number of antenna elements. Instead of simply stacking the antenna PCB 533, the antenna PCB 540 may be deployed vertically in a standing manner, so that the antenna module covers the greater number of antenna elements. A feeding line may be formed not between substrates to be stacked but on a face of the antenna PCB 540 mounted vertically, so that the antenna module accommodates the greater number of antenna elements (or antenna elements of the sub-array).

Although the single antenna PCB 540 is illustrated in the side view, embodiments of the disclosure are not limited thereto. The antenna module may include two antenna substrates. For example, when the antenna module is viewed from the front, a first antenna substrate 540*a* and a second antenna substrate 540*b* may be deployed in a standing manner between the metal plate 535 and the antenna element 531*a*. The first antenna substrate 540*a* may include one or more feeding lines for transferring a signal of a first polarization. The second antenna substrate 540*b* may include one or more feeding lines for transferring a signal of a second polarization. A first RF filter 539*a* for processing the signal of the first polarization may be deployed on a face of the metal plate 535. A second RF filter 539*b* for processing the signal of the second polarization may be deployed on a face of the metal plate 535.

Figure 5C:
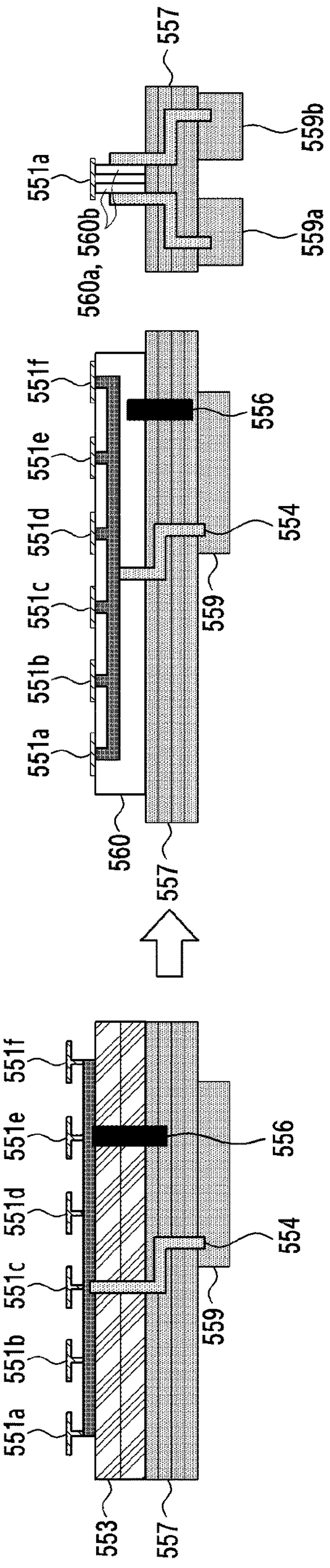
FIG. 5C is a cross-sectional view of an example antenna module based on a standing deployment of an antenna board according to embodiments.

Referring to FIG. 5C, an antenna module 550 may include antennas 551*a*, 551*b*, 551*c*, 551*d*, 551*e*, and 551*f*, an antenna PCB 553, a calibration network PCB 557, and a filter 559. The antenna module 550 may have a structure in which the antennas 551*a*, 551*b*, 551*c*, 551*d*, 551*e*, and 551*f*, the antenna PCB 553, the calibration network PCB 557, and the filter 559 are stacked in that order. A feeding line 554 for transferring an RF signal output from the filter to the antenna may be mounted across the antenna PCB 553 and the calibration network PCB 557.

According to an embodiment, the filter 559 may be a ceramic filter. In order to remove or reduce electromagnetic noise caused by the calibration network PCB 557, the antenna module may include a shield cap 556. The shield cap 556 may be deployed across the calibration network PCB 557 and the antenna PCB 553. In this case, the antenna PCB 553 may include not only the antennas 551*a*, 551*b*, 551*c*, 551*d*, 551*e*, and 551*f* but also feeding lines for the respective antennas. Since it is required that the feeding line included in the antenna PCB 553 and the shield cap 556 are designed not to have an overlapping region, the deployment of the shield cap 556 has effect on the manufacturing of the antenna PCB 553. In order to address this problem, a standing antenna board according to embodiments of the disclosure is proposed. An antenna PCB 560 may be deployed in a standing manner with respect to the calibration network PCB 557. That is, the antenna PCB 560 may be deployed in a vertically mounted manner with respect to a surface.

Although the single antenna PCB 560 is illustrated in the side view, embodiments of the disclosure are not limited thereto. The antenna module may include two antenna substrates. For example, when the antenna module is viewed from the front, a first antenna substrate 560*a* and a second antenna substrate 560*b* may be deployed in a standing manner between the calibration network PCB 557 and the antenna element 551*a*. The standing manner may refer, for example, to a structure in which a mounting face (or a standing face) of the first antenna substrate 560*a* is deployed to connect the calibration network PCB 557 and the antenna 551*a*. The standing manner may refer, for example, to a structure in which a mounting face (or a standing face) of the second antenna substrate 560*b* is deployed to connect the calibration network PCB 557 and the antenna element 551*a*. Although only the single antenna 551*a* is illustrated in the front view, embodiments of the disclosure are not limited thereto. According to an embodiment, two antenna substrates may be coupled to respective antenna elements through a deployment in which the two antenna substrates face (substantially in parallel). The first antenna substrate 560*a* may include one or more feeding lines for transferring a signal of a first polarization. The second antenna substrate 560*b* may include one or more feeding lines for transferring a signal of a second polarization. A first RF filter 559*a* for processing the signal of the first polarization may be deployed on a face of the calibration network PCB 557. A second RF filter 559*b* for processing the signal of the second polarization may be deployed on a face of the calibration network PCB 557.

Figure 5D:
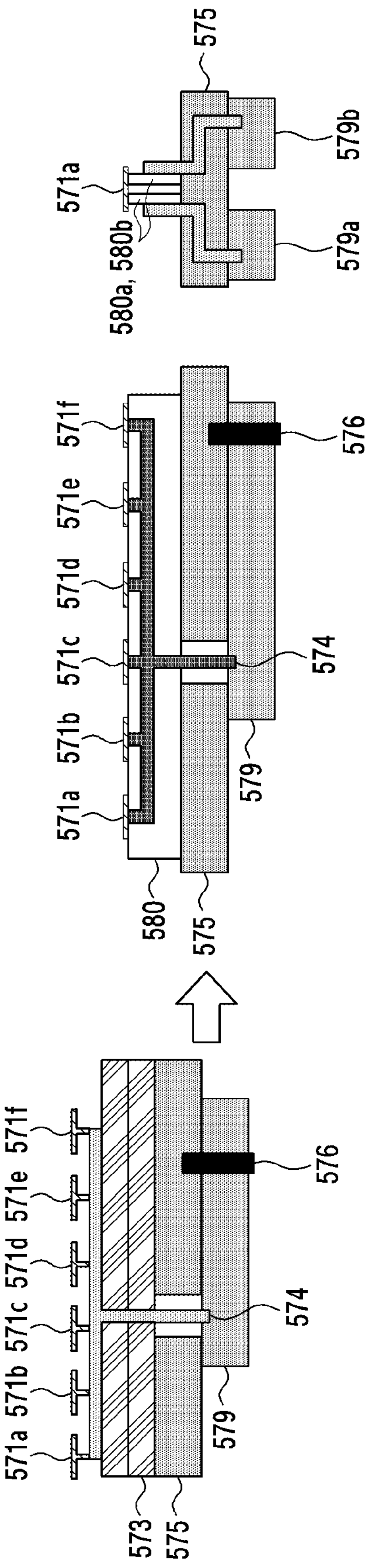
FIG. 5D is a cross-sectional view of an example antenna module based on a standing deployment of an antenna board according to embodiments.

Referring to FIG. 5D, an antenna module 570 may include antennas 571*a*, 571*b*, 571*c*, 571*d*, 571*e*, and 571*f*, an antenna PCB 573, a metal plate 575, and a filter 579. The antenna module 570 may have a structure in which the antennas 571*a*, 571*b*, 571*c*, 571*d*, 571*e*, and 571*f*, the antenna PCB 573, the metal plate 575, and the filter 579 are stacked in that order. A feeding line 574 for transferring an RF signal output from the filter to the antenna may be mounted across the antenna PCB 573, the metal plate 575. A tuning bolt 576 may be deployed across the metal plate 575 and the filter 579. Similarly to FIG. 5A, when a length of the tuning bolt 576 is increased or a stacked structure of the antenna PCB 573 becomes thick to cover a great number of antennas, there may be a design constraint. In order to address this problem, a standing antenna board according to embodiments of the disclosure is provided. The antenna PCB 540 may be deployed in a standing manner with respect to the metal plate 515. That is, the antenna PCB 540 may be deployed in a vertically mounted manner with respect to a surface.

Compared to FIG. 5B, the number of substrate layers stacked on the antenna PCB may be increased to cover a greater number of antenna elements. The antenna module may cover the greater number of antenna elements by deploying an antenna PCB 580 vertically in a standing manner, instead that the antenna PCB 573 becomes thick. Through the standing antenna board according to embodiments of the disclosure, cost of manufacturing a PCB required to accommodate the same number of antenna elements (or antenna elements of the sub-array) in the antenna module may be reduced.

Although the single antenna PCB 580 is illustrated in the side view, embodiments of the disclosure are not limited thereto. The antenna module may include two antenna substrates. For example, when the antenna module is viewed from the front, a first antenna substrate 580*a* and a second antenna substrate 580*b* may be deployed in a standing manner between the metal plate 575 and the antenna element 571*a*. The first antenna substrate 580*a* may include one or more feeding lines for transferring a signal of a first polarization. The second antenna substrate 580*b* may include one or more feeding lines for transferring a signal of a second polarization. A first RF filter 579*a* for processing the signal of the first polarization may be deployed on a face of the metal plate 575. A second RF filter 579*b* for processing the signal of the second polarization may be deployed on a face of the metal plate 575.

In FIG. 5A to FIG. 5D, a reference face on which an antenna PCB (or an antenna substrate) is mounted in a standing manner is described as a metal plate or a calibration network PCB. However, the metal plate and the calibration network PCB are only for an example of a substrate layer, and substrates or PCBs for various usages may be used so that a wide face of the antenna PCB is mounted in a standing manner. For example, a filter may be deployed to a face other than a face of the calibration network PCB. In addition, for example, the antenna PCB may be mounted vertically in a standing manner on an RU board such as a main board in addition to the metal plate. That is, examples of the antenna module to which the standing antenna board of the disclosure is deployed are not limited by a functional term expressed in front of the term such as the PCB, the substrate, the board, or the like.

Figure 6:
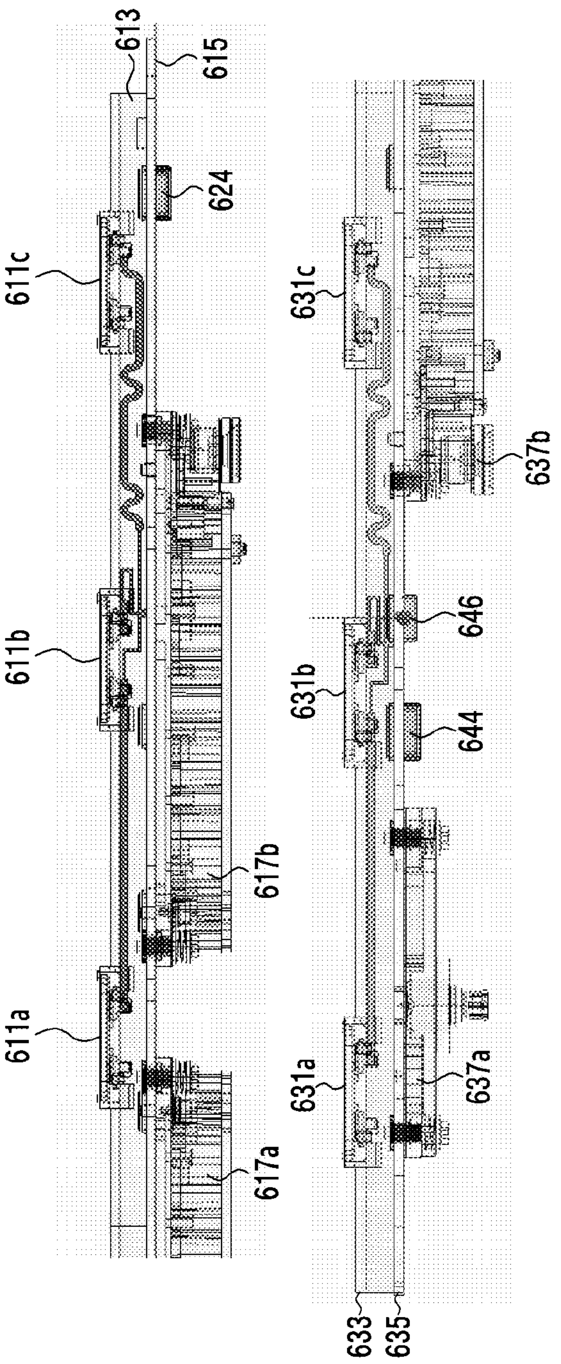
FIG. 6 is a side view of an example antenna module based on a standing deployment of an antenna board according to embodiments.

FIG. 6 is a diagram illustrating a side view of an example antenna module based on a standing deployment of an antenna board according to embodiments. A face of an antenna substrate (an antenna board) may be deployed in a standing manner against a face of the PCB. For example, at least one antenna substrate may be mounted vertically between each antenna element and the PCB.

Referring to FIG. 6, the antenna module may include an antenna substrate 613. The antenna substrate 613 may be mounted on a PCB 615 in a standing manner. The antenna substrate 613 may include feeding lines for transferring a signal to each of antenna elements 611*a*, 611*b*, and 611*c*. The antenna substrate 613 may be deployed such that a face on which the feeding line is mounted is vertical to a face of the PCB 615. At least one of filters 617*a* and 617*b* may be deployed on a face opposite to the face of the PCB 615. The PCB 615 may include a calibration network PCB for measuring performance of a circuit. For signal noise cancellation, the antenna module may further include a shield cap 624. The shield cap 624 may be deployed to penetrate the PCB 615. Due to the shield cap 624, a protrusion may be formed on a face of the PCB 615. According to embodiments of the disclosure, a wide surface of the antenna substrate 613 is mounted on the PCB 615 in a standing manner instead of being mounted on the PCB 615, thereby minimizing and/or reducing an effect caused by the protrusion. Antenna elements and a feeding circuit for each of the antenna elements may be deployed independently of a position of the protrusion. The antenna module may include an antenna substrate 633. The antenna substrate 633 may be mounted on a PCB 635 in a standing manner. The antenna substrate 633 may include feeding lines for transferring signals respectively to antenna elements 631*a*, 631*b*, and 631*c*. The antenna substrate 633 may be deployed such that the face on which the feeding line is mounted is vertical to the face of the PCB 635. At least one of filters 637*a* and 637*b* may be deployed on a face opposite to the face of the PCB 635. The PCB 635 may include a calibration network PCB. Protrusions 644 and 646 may be formed across the PCB 635.

When the antenna module is viewed from a side, the protrusions 644 and 646 may overlap with a position of an antenna element or feeding line for feeding a signal to the antenna element. However, it may be present at a spatially distinct position when viewed similarly to the perspective view of FIG. 3A. Since the antenna substrate 633 is mounted vertically with respect to a face of the PCB 635, a larger free space is present in the face of the PCB 635. Since the larger free space results in an increase in a degree of freedom in a design, embodiments of the disclosure may provide a decrease in a time and effort required for a design change. In addition, since a stacked structure may result in a decrease in an absolute PCB volume and area compared to a mounting structure, material coat also decreases.

Figure 7:
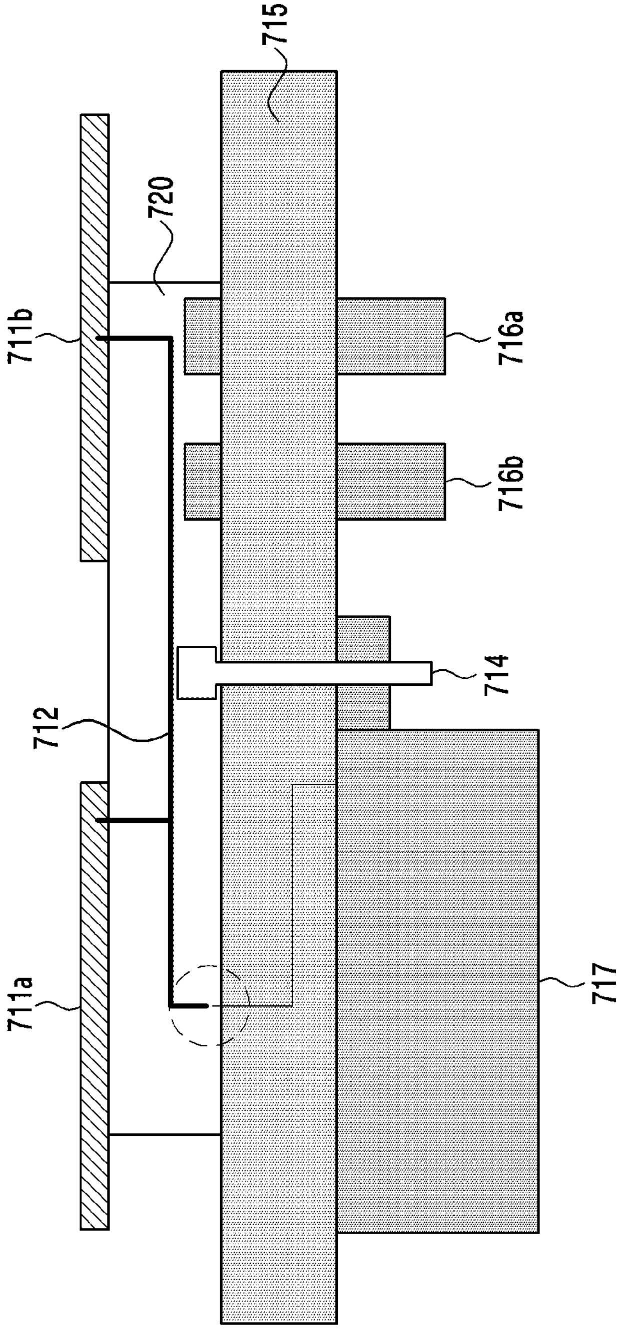
FIG. 7 is a diagram illustrating an example of an antenna module based on a standing deployment of an antenna board according to embodiments.

FIG. 7 is a diagram illustrating an example of an antenna module based on a standing deployment of an antenna board according to embodiments. A deployment scheme depending on a design constraint when an antenna module is manufactured is described with reference to FIG. 7.

Referring to FIG. 7, the antenna module may include a first antenna 711*a* and a second antenna 711*b*. The first antenna 711*a* and the second antenna 711*b* represent some of antenna elements of a sub-array. A side face of a mounting face (or a standing face) of an antenna PCB 720 is deployed to be in contact with each of the antenna elements of the sub-array. A feeding line 712 of each antenna is deployed on the mounting face of the antenna PCB 720. A feeding line 712 for the first antenna 711*a* and a feeding line 712 for the second antenna 711*b* may be deployed on the mounting face of the antenna PCB 720. The antenna PCB 720 is mounted on a calibration network PCB 715 in a standing manner. The feeding line 712 of each antenna is coupled to a filter 717 via the calibration network PCB 715. When a signal is transmitted, an output of the filter 717 is radiated to the antenna via the feeding line 712. When a signal is transmitted, a radio signal obtained through the antenna is transferred to the filter 717 via the feeding line 712.

According to an embodiment, a tuning bolt 714 may be required to adjust resonance of the filter 717. The tuning bolt 714 may be configured to control a capacitance change depending on an error of the filter 717. The turning bolt 714 may pass through the filter 717 to form a protruding region on a face of the calibration network PCB 715. In this case, the antenna PCB 720 may be mounted in front of or behind the protruding region of the tuning bolt 714. For example, as illustrated in FIG. 3A, the protruding region of the tuning bolt may be formed outside the antenna PCBs 311*a* and 311*b*. According to an embodiment, the antenna PCB 720 may be deployed in such a manner that a mounting face of the antenna PCB 720 is coupled to the calibration network PCB 715 by avoiding the protruding region.

According to an embodiment, a capacitor may be additionally deployed to minimize and/or reduce a noise effect caused by the calibration network PCB. The capacitor may include shield caps 716*a* and 716*b*. The shield caps 716*a* and 716*b* may be formed by penetrating the calibration network PCB 715. The shield caps 716*a* and 716*b* may form a protruding region on a face of the calibration network PCB 715. According to an embodiment, the antenna PCB 720 may be deployed in such a manner that a mounting face of the antenna PCB 720 is coupled to the calibration network PCB 715 by avoiding the protruding region.

Figure 8:
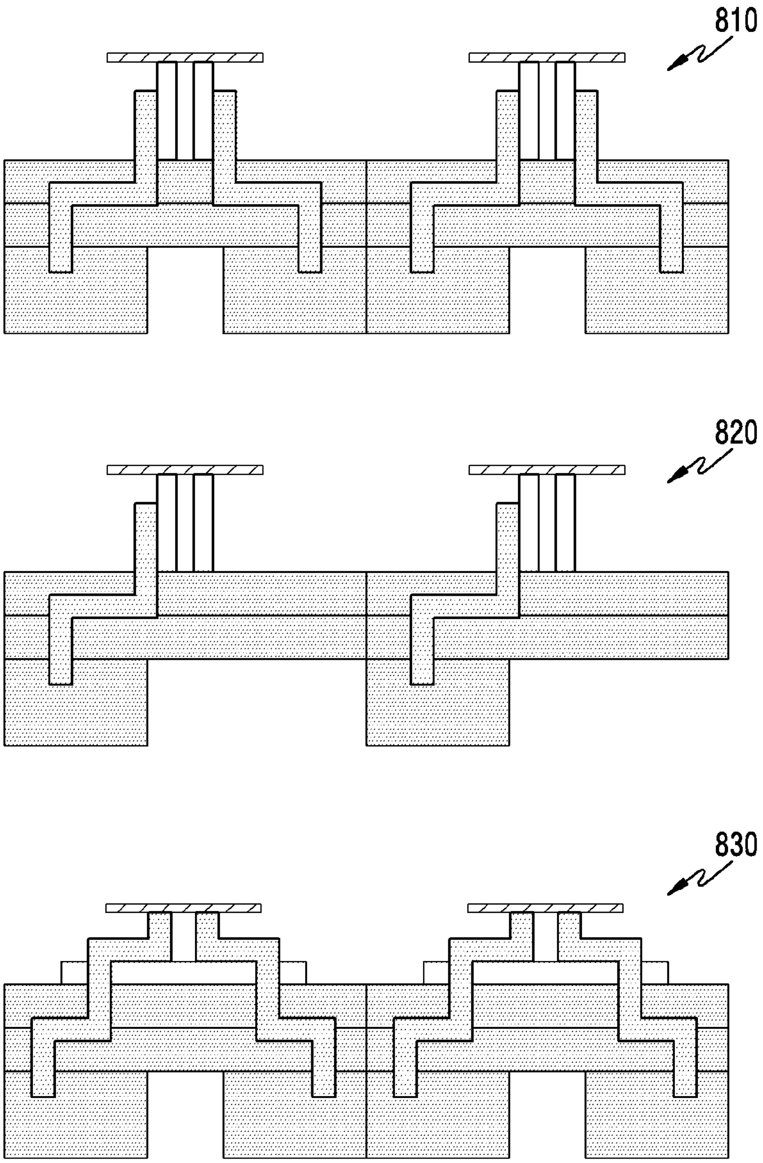
FIG. 8 is a diagram illustrating examples in which an antenna module based on a standing deployment of an antenna board is modified according to embodiments.

FIG. 8 is a diagram illustrating examples in which an antenna module based on a standing deployment of an antenna board is modified according to embodiments. In FIG. 3A to FIG. 7, a standing antenna module in which two antenna PCBs are mounted vertically on an antenna element and a calibration network PCB for a dual-polarization antenna has been described. Hereinafter, examples in which the standing antenna module is modified are described with reference to FIG. 8.

Referring to FIG. 8, in a first example 810, an antenna may include a dual-polarization antenna. A first filter for a first polarization and a second filter for a second polarization may be deployed on a calibration network PCB. A first filter may transfer an RF signal to an antenna element through a feeding line formed across the calibration network PCB and a first antenna PCB. A second filter may transfer an RF signal to an antenna element through a feeding line formed across the calibration network PCB and a second antenna PCB. The first antenna PCB and the second antenna PCB may be mounted vertically in a standing manner.

In a second example 820, an antenna may include a single-polarization antenna. One filter may be deployed on a calibration network PCB for a sub-array. The filter may transfer an RF signal through a feeding line formed across the calibration network PCB and an antenna PCB. Unlike in the first example 810, one antenna substrate may be mounted on the calibration network PCB, in a direction vertical to a patch antenna.

In a third example 830, unlike in the case where the antenna PCB is mounted vertically, the antenna PCB may be mounted horizontally, but a feeding line may be formed vertically. Although the dual-polarization antenna is illustrated for example in the third example 830, an embodiment of the third example 830 may also be applied to a single polarization. A mounting face of the antenna PCB may be substantially parallel to a mounting face of the calibration network PCB. The antenna PCB may be mounted on the calibration network PCB. A feeding line for a signal of each polarization may be deployed on the antenna PCB. The feeding line is coupled to the antenna element across the filter, the calibration network PCB, and the antenna PCB. In this case, the antenna element may be located spaced apart by a specific distance from the mounting face of the antenna PCB. The feeding line is constructed of a conductive material, and may be configured to transfer an electric signal to the antenna element. In this case, the feeding line may be formed to have a specific height. Since the antenna element is spaced apart by the specific distance from the mounting face of the antenna PCB, it may be less affected by a spatial constraint such as a shield cap or a tuning bolt.

Although an integrated antenna module structure in which an antenna PCB and a calibration network PCB are coupled without a metal plate is described for example in FIG. 8, embodiments of the disclosure are not limited thereto. The modification illustrated in FIG. 8 may also equally apply to a detachable standing antenna module.

Figure 9:
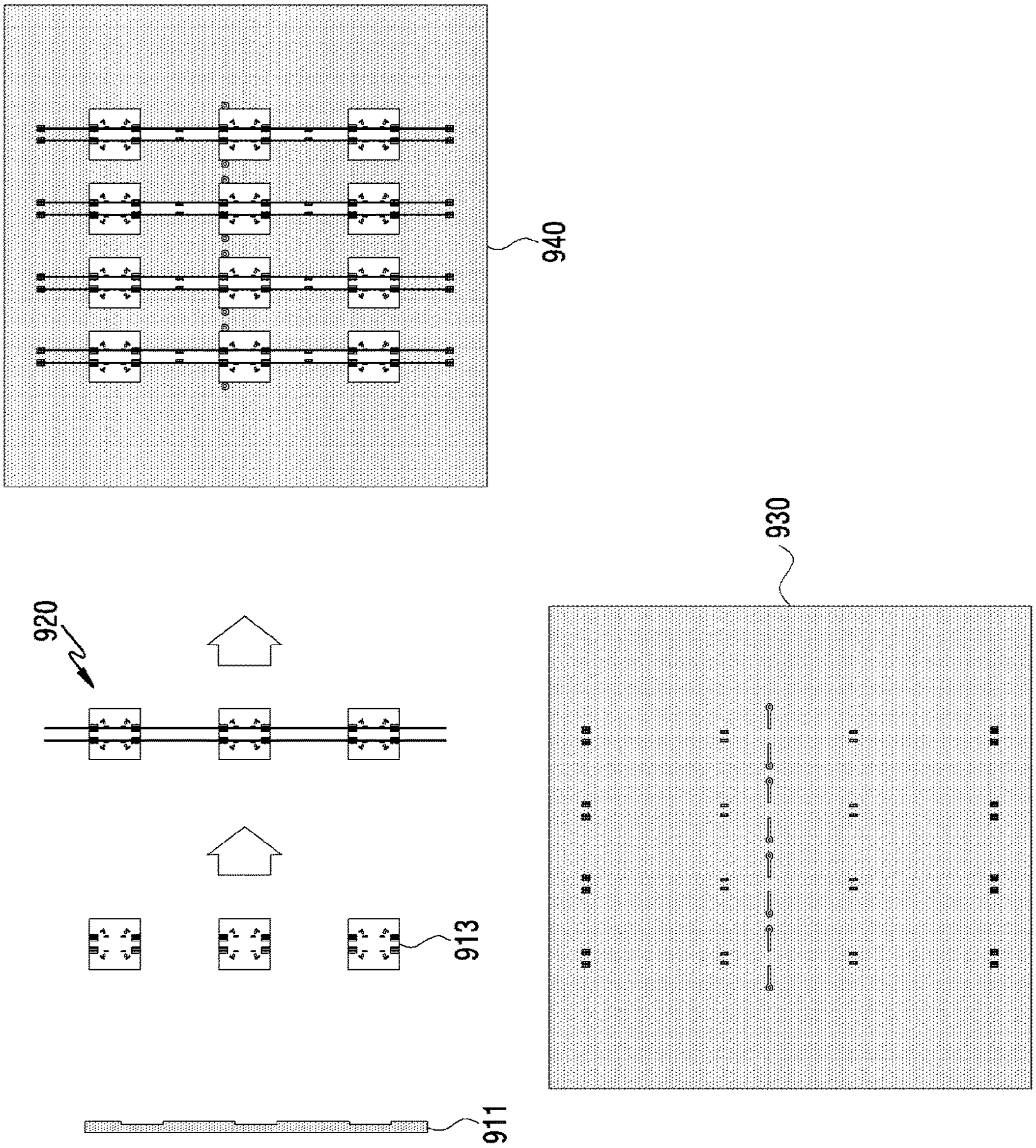
FIG. 9 is a diagram illustrating an example of a manufacturing process of an antenna module based on a standing deployment of an antenna board according to embodiments.

FIG. 9 is a diagram illustrating an example of a manufacturing process of an antenna module based on a standing deployment of an antenna board according to embodiments.

Referring to FIG. 9, one or more antenna substrates 911 and antenna elements 913 may be coupled. The antenna substrate 911 for a first polarization and the antenna substrate 911 for a second polarization may be vertically coupled to the respective antenna elements 913 for a sub-array. The coupling of the antenna substrate and the antenna elements for the respective sub-arrays may be referred to as an antenna assembly 920. According to an embodiment, the antenna assembly 920 may include two antenna substrates. Each antenna substrate may correspond to a different polarization. The two antenna substrates may be vertically coupled to the respective antenna elements so as to feed signals of different polarizations. The substrate being vertically coupled may refer, for example, to mounting faces (or standing faces) of the antenna substrates facing each other and a side face of the mounting face is coupled to the antenna element and a board 930. The antenna assemblies may be mounted on the board 930. According to an embodiment, each of the antenna assemblies may be mounted on the board 930, based on a Surface Mounted Technology (SMT). An antenna module 940 may include a plurality of antenna assemblies attached to the board 930 in the SMT manner.

Figure 10A:
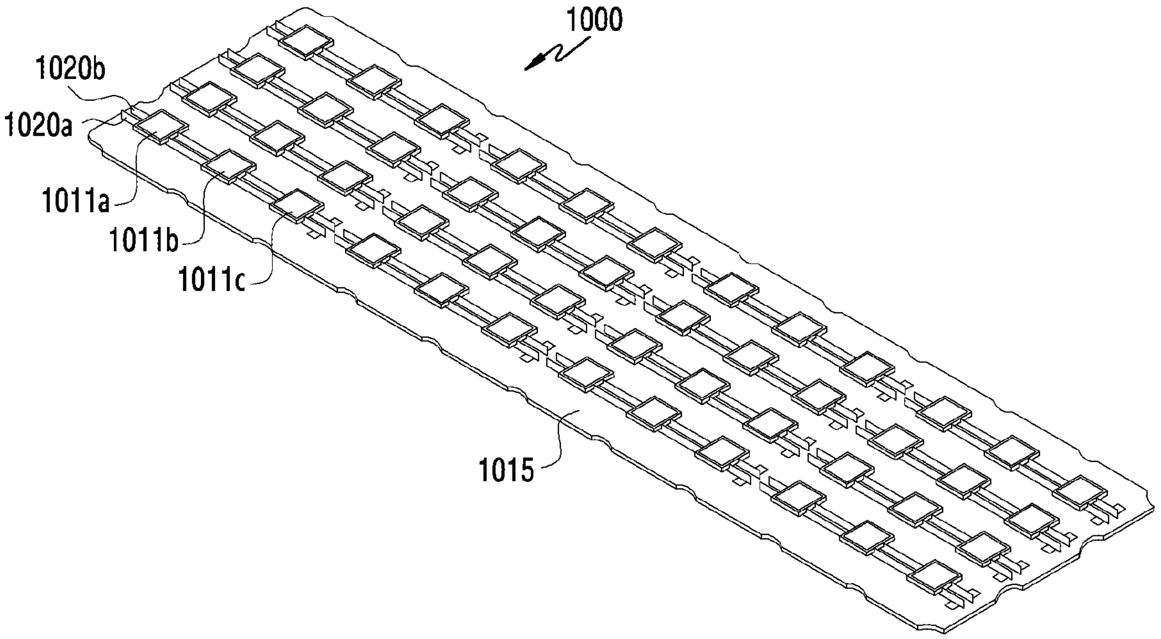
FIG. 10A is a perspective view illustrating an example of an antenna module based on a standing deployment of an antenna board according to embodiments.

FIG. 10A is a perspective view of an example antenna module based on a standing deployment of an antenna board according to embodiments. The antenna board may include a first antenna substrate for a first polarization and a second antenna substrate for a second polarization. The first antenna substrate may be deployed in a standing manner with respect to a mounting board. The second antenna substrate may be deployed in a standing manner with respect to the mounting board.

Referring to FIG. 10A, an antenna module 1000 may include a plurality of antenna elements. According to an embodiment, the plurality of antenna elements may include at least one sub-array. In FIG. 10A, an antenna module in which 12 3×1 sub-arrays are deployed is described as an example. The sub-array may include a first antenna element 1011*a*, a second antenna element 1011*b*, and a third antenna element 1011*c*. For the sub-array, two antenna substrates may be deployed. The two antenna substrates may include a first antenna substrate 1020*a* for the first polarization and a second antenna substrate 1020*b* for the second polarization. As a supporting construction for each antenna element of the sub-array, two antenna substrates may be deployed on a substrate 1015 in a standing manner. The substrate 1015 may include RF components 1014, as a Radio Unit (RU) board. The substrate 1015 may include a metal plate. The substrate 1015 may include a calibration network PCB. The substrate 1015 may include a ground circuit. Substrates including a feeding line may be deployed in a vertically standing manner with respect to a ground plane.

According to an embodiment, a first antenna substrate 1020*a* and a second antenna substrate 1020*b* may be deployed to face each other. For example, the first antenna substrate 1020*a* and the second antenna substrate 1020*b* may be deployed to be substantially parallel to each other. For feeding of a dual polarization, substrates may not be deployed in an X-shape. Instead, the substrates may be deployed to face each other. The first antenna substrate 1020*a* and the second antenna substrate 1020*b* may be coupled to respective antenna elements in a standing manner, so as to be vertical to a radiation face of each antenna element.

According to an embodiment, two antenna substrates may be deployed to provide feeding across antenna elements of a sub-array, rather than being coupled only for feeding of one antenna element. For example, as illustrated in FIG. 10A, each of the antenna elements of the sub-array may be coupled to both the first antenna substrate 1020*a* and the second antenna substrate 1020*b*. Accordingly, unlike a signal provided only for an individual antenna element, feeding lines for the sub-array are formed through one antenna PCB, thereby reducing production cost. In addition, the first antenna substrate 1020*a* and second antenna substrate 1020*b* according to embodiments of the disclosure may reduce an error, compared to a case of feeding to each antenna element through an individual PCB, when a sub-array technology is implemented for transmitting the same RF signal.

Figure 10B:
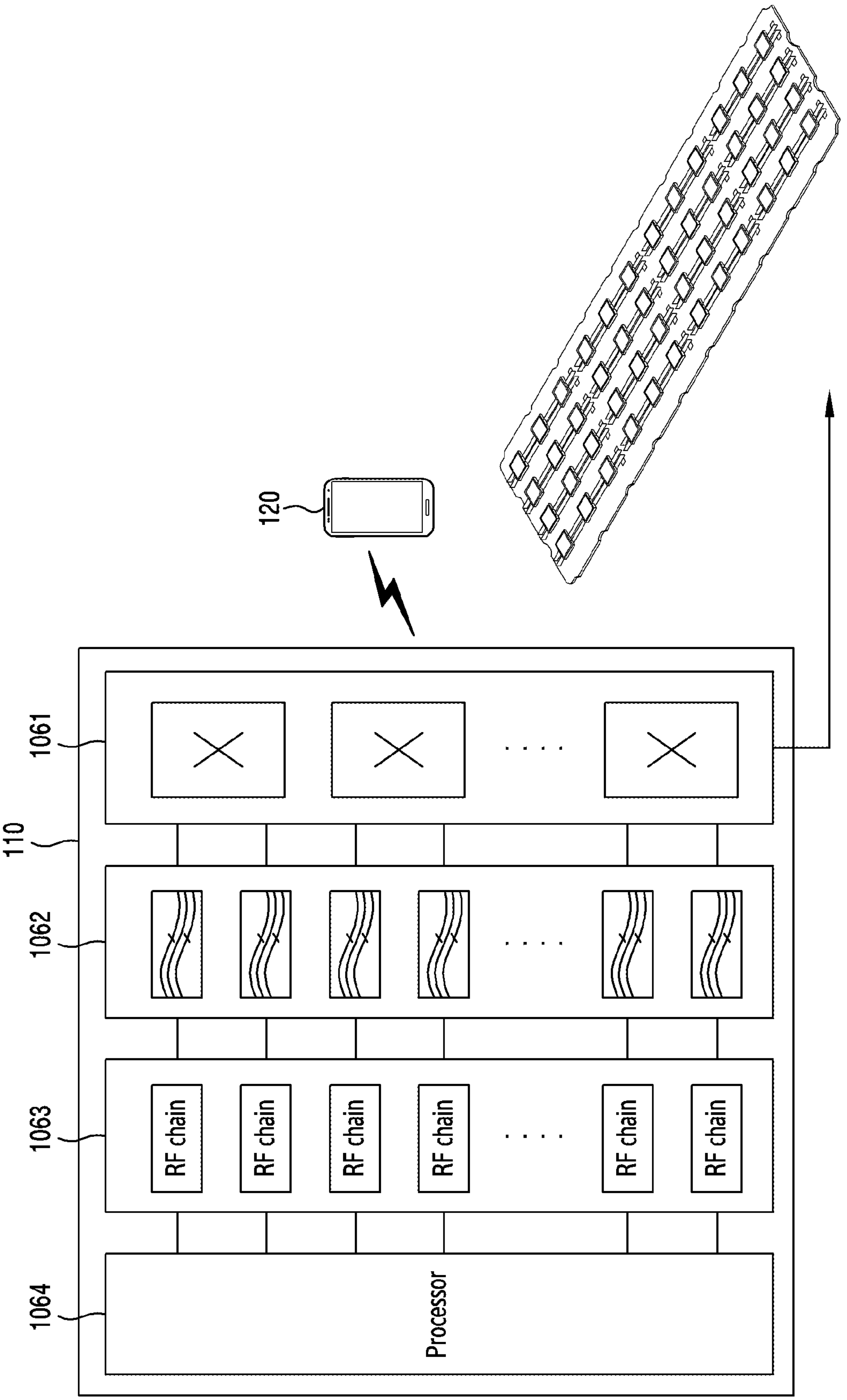
FIG. 10B is a diagram illustrating an example functional configuration of an electronic device including a standing deployment of an antenna board according to embodiments.

FIG. 10B is a diagram illustrating an example functional configuration of an electronic device including a standing deployment of an antenna board according to embodiments. An electronic device 110 may be one of the base station 110 and terminal 120 of FIG. 1. According to an embodiment, the electronic device 110 may be an MMU. Not only the antenna structure itself mentioned through FIG. 1 to FIG. 10A but also an electronic device including the antenna structure are included in embodiments of the disclosure. For effective deployment of antenna elements, the electronic device 110 may include a standing antenna module.

Referring to FIG. 10B, an example functional configuration of the electronic device 110 is illustrated. The electronic device 110 may include an antenna unit (e.g., including at least one antenna) 1061, a filter unit (e.g., including at least one filter) 1062, a Radio Frequency (RF) processing unit (e.g., including RF circuitry) 1063, and a processor (e.g., including processing circuitry) 1064.

The antenna unit 1061 may include a plurality of antennas. The antenna performs functions for transmitting and receiving signals through a radio channel. The antenna may include a radiator formed on a side face of a substrate (e.g., a PCB). The antenna may radiate an up-converted signal on the radio channel or obtain a signal radiated by another device. Each antenna may be referred to as an antenna element or an antenna device. In various embodiments, the antenna unit 1061 may include an antenna array in which a plurality of antenna elements comprise an array. According to an embodiment, a sub-array technology may be used. The antenna array may include a plurality of sub-arrays. One sub-array may include a plurality of antenna elements. For example, the sub-array may include two antenna elements. In addition, for example, the sub-array may include three antenna elements. In addition, for example, the sub-array may include six antenna elements. The antenna unit 1061 may be electrically coupled to the filter unit 1062 through RF signal lines.

The antenna unit 1061 may include an antenna PCB mounted vertically on each of antenna elements. The PCB may include a plurality of RF signal lines to couple each antenna element and a filter of the filter unit 1062. The RF signal lines may be referred to as a feeding network. For example, a pattern for the feeding network may be formed on a mounting face of the antenna PCB. The antenna unit 1061 may provide a received signal to the filter unit 1062 or may radiate the signal provided from the filter unit 1062 into the air.

According to an embodiment, the antenna unit 1061 may include at least one antenna module having a dual-polarization antenna. The dual-polarization antenna may be, for example, a cross-pol (x-pol) antenna. The dual-polarization antenna may include two antenna elements corresponding to different polarizations. For example, the dual-polarization antenna may include a first antenna element having a polarization of +45° and a second antenna element having a polarization of −45°. It is apparent that the polarization may be formed of other polarizations orthogonal to each other, in addition to +45° and −45°. Each antenna element may be coupled to a feeding line, and may be electrically coupled to the filter unit 1062, the RF processing unit 1063, and the processor 1064 to be described later.

According to an embodiment, the dual-polarization antenna may be a patch antenna (or a micro-strip antenna). Since the dual-polarization antenna has a form of a path antenna, it may be easily implemented and integrated as an array antenna. Two signals having different polarizations may be input to respective antenna ports. Each antenna port corresponds to an antenna element. For high efficiency, it is required to optimize a relationship between a co-pol characteristic and a cross-pol characteristic between the two signals having the different polarizations. In the dual-polarization antenna, the co-pol characteristic indicates a characteristic for a specific polarization component and the cross-pol characteristic indicates a characteristic for a polarization component different from the specific polarization component.

The filter unit 1062 may include at least one filter and perform filtering to transmit a signal of a desired frequency. The filter unit 1062 may perform a function for selectively identifying a frequency by forming a resonance. In various embodiments, the filter unit 1062 may structurally form the resonance through a cavity including a dielectric. In addition, in various embodiments, the filter unit 1062 may form a resonance through elements which form inductance or capacitance. In addition, in various embodiments, the filter unit 1062 may include a Bulk Acoustic Wave (BAW) filter or a Surface Acoustic Wave (SAW) filter. The filter unit 1062 may include at least one of a band pass filter, a low pass filter, a high pass filter, and a band reject filter. That is, the filter unit 1062 may include RF circuits for obtaining a signal of a frequency band for transmission or a frequency band for reception. The filter unit 1062 according to various embodiments may electrically couple the antenna unit 1061 and the RF processing unit 1063 to each other.

The RF processing unit 1063 may include a plurality of RF paths including various RF circuitry. The RF path may be a unit of a path through which a signal received through an antenna or a signal radiated through the antenna passes. At least one RF path may be referred to as an RF chain. The RF chain may include a plurality of RF elements. The RF elements may include an amplifier, a mixer, an oscillator, a Digital-to-Analog Converter (DAC), an Analog-to-Digital Converter (ADC), or the like. For example, the RF processing unit 1063 may include an up converter which up-converts a digital transmission signal of a baseband to a transmission frequency, and a DAC which converts the converted digital transmission signal into an analog RF transmission signal. The converter and the DAC comprise a transmission path in part. The transmission path may further include a Power Amplifier (PA) or a coupler (or a combiner). In addition, for example, the RF processing unit 1063 may include an ADC which converts an analog RF reception signal into a digital reception signal and a down converter which converts the digital reception signal into a digital reception signal of a baseband. The ADC and the down converter comprise a reception path in part. The reception path may further include a Low-Noise Amplifier (LNA) or a coupler (or a divider). RF parts of the RF processing unit may be implemented on a PCB. The electronic device 110 may include a structure in which the antenna unit 1061, the filter unit 1052, and the RF processing unit 1063 are stacked in that order. The antennas and the RF parts of the RF processing unit may be implemented on the PCB, and filters may be repeatedly fastened between one PCB and another PCB to comprise a plurality of layers.

The processor 1064 may include various processing circuitry and provide overall control to the electronic device 1060. The processor 1064 may include various modules for performing communication. The processor 1064 may include at least one processor such as a modem. The processor 1064 may include modules for digital signal processing. For example, the processor 1064 may include a modem. In data transmission, the processor 1064 generates complex symbols by encoding and modulating a transmission bit-stream. In addition, for example, in data reception, the processor 1064 restores a reception bit-stream by demodulating and decoding a baseband signal. The processor 1064 may perform functions of a protocol stack required in a communication standard.

The functional configuration of the electronic device 110 is described in FIG. 10B as equipment capable of utilizing an antenna structure of the disclosure. However, the example of FIG. 10B is merely a non-limiting example configuration for utilizing an antenna module according to various embodiments of the disclosure described through FIG. 1 to FIG. 10A, and embodiments of the disclosure are not limited to components of the equipment of FIG. 10B. Therefore, a communication equipment with another configuration, including an antenna module, and a structure itself in the antenna module may also be understood as an embodiment of the disclosure.

According to various embodiments of the disclosure, an antenna module in a wireless communication system may include: a plurality of antenna elements; a first antenna substrate; a second antenna substrate; and a Printed Circuit Board (PCB). A first side of the first antenna substrate may be coupled to each of the plurality of antenna elements, and a second side of the first antenna substrate opposite to the first side of the first antenna substrate may be coupled to the PCB. A first side of the second antenna substrate may be coupled to each of the plurality of antenna elements, and a second side of the second antenna substrate opposite to the first side of the second antenna substrate may be coupled to the PCB. A face between the first side of the first antenna substrate and the second side of the first antenna substrate may be deployed to face a face between the first side of the second antenna substrate and the second side of the second antenna substrate.

According to an example embodiment, the first antenna substrate may be related to a first polarization. The second antenna substrate may be related to a second polarization. The second polarization may be orthogonal to the first polarization.

According to an example embodiment, the first antenna substrate may include a first Radio Frequency (RF) filter and first feeding lines for an electrical connection between the plurality of antenna elements. The second antenna substrate may include a second RF filter and second feeding lines for an electrical connection between the plurality of antenna elements.

According to an example embodiment, the plurality of antenna elements may comprise a sub-array. The first antenna substrate may include a first feeding network circuit for the sub-array. The second antenna substrate may include a second feeding network circuit for the sub-array.

According to an example embodiment, the second side of the first antenna substrate and the second side of the second antenna substrate may be mounted on a first face of the PCB. At least one RF filter may be mounted on a second face of the PCB opposite to the first face of the PCB.

According to an example embodiment, on the first face of the PCB, a protruding region formed by a shield cap and/or a tuning bolt may be deployed between a mounting region of the second side of the first antenna substrate and a mounting region of the second side of the second antenna substrate.

According to an example embodiment, on the first face of the PCB, the mounting regions of the second side of the first antenna substrate and the second side of the second antenna substrate may not overlap with the protruding region formed by the shield cap and/or the turning bolt.

According to an example embodiment, the antenna module may further include a shield cap formed across one or more layers of the PCB.

According to an example embodiment, the face of the first antenna substrate may be mounted to be substantially vertical to a face of the PCB. The face of the second antenna substrate may be mounted to be substantially vertical to the face of the PCB.

According to an example embodiment, the PCB may include a metal plate and a calibration network PCB.

According to an example embodiment, the PCB may include a calibration network PCB.

According to example embodiments of the disclosure, an electronic device in a wireless communication system may include: an antenna array including a plurality of sub-arrays; a plurality of first antenna substrates; a plurality of second antenna substrates; a printed circuit board (PCB) on which a plurality of radio frequency (RF) filters are deployed; a power supply; and a processor. A sub-array among the plurality of sub-arrays may include a plurality of antenna elements. The plurality of first antenna substrates may include a first antenna substrate corresponding to the sub-array. The plurality of second antenna substrates may include a second antenna substrate corresponding to the sub-array. A first side of the first antenna substrate may be coupled to each of the plurality of antenna elements, and a second side of the first antenna substrate opposite to the first side of the first antenna substrate may be coupled to the PCB. A first side of the second antenna substrate may be coupled to each of the plurality of antenna elements, and a second side of the second antenna substrate opposite to the first side of the second antenna substrate may be coupled to the PCB. A face between the first side of the first antenna substrate and the second side of the first antenna substrate may face a face between the first side of the second antenna substrate and the second side of the second antenna substrate.

According to an example embodiment, the first antenna substrate may be related to a first polarization. The second antenna substrate may be related to a second polarization. The second polarization may be orthogonal to the first polarization.

According to an example embodiment, the plurality of RF filters may include a first RF filter and second RF filter for the sub-array. The first antenna substrate may include the first RF filter and first feeding lines for an electrical connection between the plurality of antenna elements. The second antenna substrate may include the second RF filter and second feeding lines for the plurality of antenna elements.

According to an example embodiment, the first antenna substrate may include a first feeding network circuit for the sub-array. The second antenna substrate may include a second feeding network circuit for the sub-array.

According to an example embodiment, the second side of the first antenna substrate and the second side of the second antenna substrate may be mounted on a first face of the PCB. The at least one RF filter may be mounted on a second face opposite to the first face of the PCB.

According to an example embodiment, on the first face of the PCB, a protruding region formed by a shield cap and/or a tuning bolt may be deployed between a mounting region of the second side of the first antenna substrate and a mounting region of the second side of the second antenna substrate.

According to an example embodiment, the electronic device may further include a shield cap formed across one or more layers of the PCB.

According to an example embodiment, the face of the first antenna substrate may be mounted to be substantially vertical to a face of the PCB. The face of the second antenna substrate may be mounted to be substantially vertical to the face of the PCB.

According to an example embodiment, the PCB may include a metal plate and a calibration network PCB.

According to an example embodiment, the PCB may include a calibration network PCB.

An antenna element of a sub-array type in which one antenna element or at least two antenna elements are coupled has been described for example in the disclosure. At least one antenna element may be mounted on an antenna PCB having a feeding circuit formed thereon. According to an embodiment, each antenna element may be coupled to the antenna PCB at a side face of a face on which the feeding circuit of the antenna PCB is formed. The antenna PCB may be electrically coupled at a side face opposite to the side face at which the antenna element is coupled. According to an embodiment, a calibration network for output power monitoring may be located between the antenna PCB and the filter. According to an embodiment, the antenna module may further include a mechanical plane between the antenna PCB and the filter and a metal plate for electrical isolation. According to an embodiment, the antenna module may further include a metal plate between the antenna PCB and the calibration network PCB.

Methods based on the embodiments disclosed in the claims and/or the disclosure may be implemented in hardware, software, or a combination of both.

When implemented in software, computer readable recording medium for storing one or more programs (e.g., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or the disclosure.

The program (e.g., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned various example embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been illustrated and described with reference to various embodiments thereof, it will be understood that the various example embodiments are intended to be illustrative, not limiting. It will be further understood by those skilled in the art that various changes in form and details may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An antenna module in a wireless communication system, comprising:

a plurality of antenna elements;

a first antenna substrate;

a second antenna substrate; and a Printed Circuit Board (PCB), wherein a first side of the first antenna substrate is coupled to each of the plurality of antenna elements, and a second side of the first antenna substrate opposite to the first side of the first antenna substrate is coupled to the PCB, wherein a first side of the second antenna substrate is coupled to each of the plurality of antenna elements, and a second side of the second antenna substrate opposite to the first side of the second antenna substrate is coupled to the PCB, and wherein a face between the first side of the first antenna substrate and the second side of the first antenna substrate faces a face between the first side of the second antenna substrate and the second side of the second antenna substrate.

2. The antenna module of claim 1, wherein the first antenna substrate is related to a first polarization, wherein the second antenna substrate is related to a second polarization, and wherein the second polarization is orthogonal to the first polarization.

3. The antenna module of claim 2, wherein the first antenna substrate includes a first Radio Frequency (RF) filter and first feeding lines configured to provide an electrical connection between the plurality of antenna elements, and wherein the second antenna substrate includes a second RF filter and second feeding lines configured to provide an electrical connection between the plurality of antenna elements.

4. The antenna module of claim 2, wherein the plurality of antenna elements include a sub-array, wherein the first antenna substrate includes a first feeding network circuit for the sub-array, and wherein the second antenna substrate includes a second feeding network circuit for the sub-array.

5. The antenna module of claim 1, wherein the second side of the first antenna substrate and the second side of the second antenna substrate are mounted on a first face of the PCB, and wherein at least one RF filter is mounted on a second face of the PCB opposite to the first face of the PCB.

6. The antenna module of claim 5, wherein on the first face of the PCB, a protruding region formed by a shield cap or a tuning bolt is disposed between a mounting region of the second side of the first antenna substrate and a mounting region of the second side of the second antenna substrate.

7. The antenna module of claim 1, further comprising a shield cap formed across one or more layers of the PCB.

8. The antenna module of claim 1, wherein the face of the first antenna substrate is mounted to be substantially vertical to a face of the PCB, and wherein the face of the second antenna substrate is mounted to be substantially vertical to the face of the PCB.

9. The antenna module of claim 1, wherein the PCB includes a metal plate and a calibration network PCB.

10. The antenna module of claim 1, wherein the PCB includes a calibration network PCB.

11. An electronic device in a wireless communication system, comprising:

an antenna array including a plurality of sub-arrays;

a plurality of first antenna substrates;

a plurality of second antenna substrates;

a Printed Circuit Board (PCB) on which a plurality of radio frequency (RF) filters are deployed;

a power supply; and a processor, wherein a sub-array among the plurality of sub-arrays includes a plurality of antenna elements, wherein the plurality of first antenna substrates include a first antenna substrate corresponding to the sub-array, wherein the plurality of second antenna substrates include a second antenna substrate corresponding to the sub-array, wherein a first side of the first antenna substrate is coupled to each of the plurality of antenna elements, and a second side of the first antenna substrate opposite to the first side of the first antenna substrate is coupled to the PCB, wherein a first side of the second antenna substrate is coupled to each of the plurality of antenna elements, and a second side of the second antenna substrate opposite to the first side of the second antenna substrate is coupled to the PCB, and wherein a face between the first side of the first antenna substrate and the second side of the first antenna substrate faces a face between the first side of the second antenna substrate and the second side of the second antenna substrate.

12. The electronic device of claim 11, wherein the first antenna substrate is related to a first polarization, wherein the second antenna substrate is related to a second polarization, and wherein the second polarization is orthogonal to the first polarization.

13. The electronic device of claim 12, wherein the plurality of RF filters include a first RF filter and second RF filter for the sub-array, wherein the first antenna substrate includes the first RF filter and first feeding lines configured to provide an electrical connection between the plurality of antenna elements, and wherein the second antenna substrate includes the second RF filter and second feeding lines configured to provide an electrical connection between the plurality of antenna elements.

14. The electronic device of claim 12, wherein the first antenna substrate includes a first feeding network circuit for the sub-array, and wherein the second antenna substrate includes a second feeding network circuit for the sub-array.

15. The electronic device of claim 11, wherein the second side of the first antenna substrate and the second side of the second antenna substrate are mounted on a first face of the PCB, and wherein the at least one RF filter is mounted on a second face of the PCB opposite to the first face of the PCB.

16. The electronic device of claim 15, wherein on the first face of the PCB, a protruding region formed by a shield cap or a tuning bolt is disposed between a mounting region of the second side of the first antenna substrate and a mounting region of the second side of the second antenna substrate.

17. The electronic device of claim 11, further comprising a shield cap formed across one or more layers of the PCB.

18. The electronic device of claim 11, wherein the face of the first antenna substrate is mounted to be substantially vertical to a face of the PCB, and wherein the face of the second antenna substrate is mounted to be substantially vertical to the face of the PCB.

19. The electronic device of claim 11, wherein the PCB includes a metal plate and a calibration network PCB.

20. The electronic device of claim 11, wherein the PCB includes a calibration network PCB.

* * * * *